US010132825B2

(12) United States Patent
Kawai et al.

(10) Patent No.: US 10,132,825 B2
(45) Date of Patent: Nov. 20, 2018

(54) MOVING SPEED ESTIMATION DEVICE FOR MOBILE BODY AND CONTROL DEVICE FOR MOBILE BODY

(71) Applicant: HONDA MOTOR CO., LTD., Tokyo (JP)

(72) Inventors: Takayuki Kawai, Saitama (JP); Kaoru Toba, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 294 days.

(21) Appl. No.: 15/133,637

(22) Filed: Apr. 20, 2016

(65) Prior Publication Data

US 2016/0313364 A1  Oct. 27, 2016

(30) Foreign Application Priority Data

Apr. 27, 2015 (JP) ................................. 2015-090384

(51) Int. Cl.
| | |
|---|---|
| G01P 11/00 | (2006.01) |
| G01C 21/10 | (2006.01) |
| G06K 9/00 | (2006.01) |

(52) U.S. Cl.
CPC .............. G01P 11/00 (2013.01); G01C 21/10 (2013.01); G06K 9/00342 (2013.01)

(58) Field of Classification Search
CPC ...... G01P 11/00; G06K 9/00342; G01C 21/10
USPC ....................................................... 702/142
See application file for complete search history.

(56) References Cited

U.S. PATENT DOCUMENTS

| | | | | |
|---|---|---|---|---|
| 6,317,652 B1* | 11/2001 | Osada | ................... | B25J 19/023 318/568.1 |
| 2014/0136142 A1* | 5/2014 | Rolt | ....................... | G01S 15/58 702/143 |
| 2014/0249398 A1* | 9/2014 | Morris | ............... | A61B 5/02125 600/393 |
| 2014/0263825 A1* | 9/2014 | Heverly, II | ......... | F16F 15/0275 244/60 |
| 2015/0127285 A1* | 5/2015 | Shirai | ...................... | G01P 7/00 702/96 |

FOREIGN PATENT DOCUMENTS

JP  2012-128585  7/2012

* cited by examiner

*Primary Examiner* — Vu A Vu
(74) *Attorney, Agent, or Firm* — Rankin, Hill & Clark LLP

(57) ABSTRACT

A moving speed estimation device which includes a vibration component information estimation unit 4 which estimates the vibration cycle or vibration frequency of the periodic vibration component included in instantaneous moving speed of a mobile body A along with a periodic moving action of the mobile body A. The moving speed estimation device also includes a speed estimated value adjustment processing unit 5 which sequentially generates speed values as estimated values of the moving speed of the mobile body A, where the speed value is obtained by performing at least processing of removing a vibration component corresponding to the estimated value of the vibration cycle or vibration frequency for the time series of the instantaneous moving speed estimated from the time series of the measured value of the position of the mobile body A.

10 Claims, 15 Drawing Sheets

MOVING SPEED ESTIMATION DEVICE FOR MOBILE BODY AND CONTROL DEVICE FOR MOBILE BODY

BACKGROUND OF THE INVENTION

Field of the Invention

The present invention relates to a device for estimating the moving speed of a mobile body and a control device for the mobile body.

Description of the Related Art

There has been suggested a technique of moving a mobile body such as a mobile robot or the like in an operating environment space in which any other mobile body or the like exists together, for example, in Japanese Patent Application Laid-Open No. 2012-428585 (hereinafter referred to as Patent Document 1).

In the technique as described in Patent Document 1, it is necessary to estimate a future position of the mobile body. Additionally, the estimation requires an accurate estimated value or measured value of the moving speed of the mobile body.

It should be noted here that the momentary moving speed (instantaneous moving speed) of the mobile body vibrates in some cases around the average moving speed even if the moving distance (average moving speed) per unit time of the mobile body is substantially constant depending on the mode of the moving action of the mobile body.

For example, a legged mobile body such as a person or a legged mobile robot moves while repeating the landing of each leg and the movement of the leg in the air and therefore the upper body or base of the legged mobile body moves in such a way that the instantaneous moving speed in the right-left direction, the up-down direction, or the front-rear direction of the mobile body periodically vibrates.

In addition, even if this instantaneous moving speed of the mobile body is sequentially estimated or measured, the instantaneous moving speed has a speed component in a direction different from the actual moving direction of the mobile body or deviates from the average moving speed in the moving direction. Accordingly, if the future position is predicted from the estimated value or measured value of the instantaneous moving speed of the mobile body, a wrong prediction is easily made.

Incidentally, there can be an idea that the moving speed of the mobile body is estimated by performing processing of averaging the estimated values or measured values of the instantaneous moving speed of the mobile body. In this case, however, if the time width for averaging is short, the vibration components of the instantaneous moving speed cannot be sufficiently removed. Moreover, if the time width for averaging is long, the moving speed of the mobile body is estimated too late.

SUMMARY OF THE INVENTION

The present invention has been made in view of the above background. Therefore, it is an object of the present invention to provide a moving speed estimation device capable of appropriately estimating the moving speed of a mobile body which moves at speed including a periodic vibration component generated along with a periodic moving action.

Moreover, it is also an object of the present invention to provide a control device capable of appropriately controlling the movement of the mobile body by using the moving speed estimation device.

According to an aspect of the present invention, there is provided a moving speed estimation device for a mobile body for estimating a moving speed of the mobile body which moves at speed including a periodic vibration component generated along with a periodic moving action, the device including: a position measuring unit which sequentially measures a position of the mobile body; an instantaneous moving speed estimation unit which sequentially estimates an instantaneous moving speed of the mobile body from a time series of a measured value of the position of the mobile body obtained by the position measuring unit; a vibration component information estimation unit which estimates a vibration cycle or vibration frequency of the periodic vibration component included in a time series of the instantaneous moving speed of the mobile body along with the periodic moving action of the mobile body; and a speed estimated value adjustment processing unit which sequentially generates speed values as estimated values of the moving speed of the mobile body, where the speed value is obtained by performing at least processing of removing a vibration component corresponding to the estimated value of the vibration cycle or vibration frequency obtained by the vibration component information estimation unit for the time series of an estimated value of the instantaneous moving speed obtained by the instantaneous moving speed estimation unit (first aspect of the invention).

According to the invention as described above, the vibration component information estimation unit estimates the vibration cycle or vibration frequency of the periodic vibration component included in the instantaneous moving speed of the mobile body along with periodic moving action of the mobile body.

In addition, the speed estimated value adjustment processing unit sequentially generates speed values as estimated values of the moving speed of the mobile body, where the speed value is obtained by performing at least processing of removing a vibration component corresponding to the estimated value of the vibration cycle or vibration frequency obtained by the vibration component information estimation unit for the time series of the estimated value of the instantaneous moving speed obtained by the instantaneous moving speed estimation unit.

Therefore, the estimated value of the moving speed of the mobile body generated by the speed estimated value adjustment processing unit is an estimated value from which the vibration component generated along with the periodic moving action of the mobile body is removed. Consequently, the estimated value of the moving speed of the mobile body is obtained in a manner in which the fluctuation of the estimated value suppressed.

Therefore, according to the present invention, the moving speed of the mobile body moving at a speed including a periodic vibration component generated along with periodic moving action is able to be estimated appropriately.

In the first aspect of the invention, the vibration component information estimation unit may be configured to estimate the vibration cycle or vibration frequency from a frequency at which a spectral intensity has a peak value in spectral distribution data obtained by transforming the time series of the estimated value of the instantaneous moving speed of the mobile body to a frequency domain (second aspect of the invention).

According thereto, the vibration cycle or vibration frequency of the periodic vibration component is able to be estimated on the basis of actual data. This enables an increase in reliability of the estimated value of the moving speed of the mobile body.

Furthermore, in the first aspect of the invention, the vibration component information estimation unit may be configured to estimate the vibration cycle or vibration frequency based on previously-created data for estimating the vibration cycle or vibration frequency (third aspect of the invention).

According thereto, the vibration component information estimation unit is able to estimate the vibration cycle or vibration frequency without need for processing of obtaining spectral distribution data.

In the above third aspect of the invention, correlation data representing a relationship between the moving speed and the vibration cycle or vibration frequency of the mobile body may be used as the data. In this case, preferably the vibration component information estimation unit is preferably configured to update and decide the estimated value of the vibration cycle or vibration frequency based on the correlation data from the estimated value of the moving speed fed back from the speed estimated value adjustment processing unit (fourth aspect of the invention).

According thereto, the estimated value of the vibration cycle or vibration frequency is able to be updated with an actual moving state of the mobile body reflected thereon while the mobile body is moving. This enables an increase in the reliability of the estimated value of the moving speed of the mobile body.

In the above first aspect of the invention, preferably the speed estimated value adjustment processing unit is configured to perform processing of removing the vibration component corresponding to the estimated value of the vibration cycle or vibration frequency with a band-stop filter configured based on the estimated value of the vibration cycle or vibration frequency (fifth aspect of the invention).

According thereto, the followability to changes in the actual moving speed can be increased with respect to the estimated value of the moving speed of the mobile body.

Moreover, in the above first aspect of the invention, in the case where the mobile body is a legged mobile body, preferably the speed estimated value adjustment processing unit is configured to perform processing of removing the vibration component of a first vibration frequency, which is a lowest frequency, among the vibration components as the vibration component generated along with the periodic moving action of the mobile body and the vibration component of a second vibration frequency, which is a double frequency of the first vibration frequency, from the estimated value of the instantaneous moving speed, and the vibration component information estimation unit is configured to estimate at least one of the first vibration frequency, a first vibration cycle corresponding to the first vibration frequency, the second vibration frequency, and a second vibration cycle corresponding to the second vibration frequency (sixth aspect of the invention).

Specifically, in the case where the mobile body is a legged mobile body, usually the vibration component generated along with the periodic moving action of the mobile body includes a lot of first vibration frequency components as fundamental wave components and second vibration frequency components of a frequency which is a double frequency of the first vibration frequency. Therefore, according to the sixth invention, the speed estimated value adjustment processing unit is able to generate the estimated value of the moving speed of the mobile body with the fluctuation thereof effectively suppressed. Moreover, if one of four parameters, which are the first vibration frequency, the first vibration cycle corresponding to the first vibration frequency, the second vibration frequency, and the second vibration cycle corresponding to the second vibration frequency, is decided, the values of the remaining three parameters are also decided. Therefore, the vibration component information estimation unit only needs to estimate a value of at least one of the above four parameters.

In the first aspect of the invention, preferably the speed estimated value adjustment processing unit is configured to sequentially generate the estimated values of the moving speed of the mobile body by further performing processing of removing components in a higher frequency domain than the vibration component with a high-frequency component removal filter in addition to the vibration component corresponding to the estimated value of the vibration cycle or vibration frequency from the estimated value of the instantaneous moving speed (seventh aspect of the invention).

According to the seventh aspect of the invention, a noise component in a high-frequency domain can be removed from the estimated value of the moving speed of the mobile body in addition to the vibration component generated along with the periodic moving action of the mobile body.

Therefore, the reliability of the estimated value of the moving speed of the mobile body can be further increased.

Subsequently, a control device for a mobile body according to the present invention uses the aforementioned moving speed estimation device. The control device for a mobile body is a control device which performs movement control of a mobile body to be controlled, which moves in an operating environment space, the device including: a future position prediction unit which predicts a future position of each of mobile bodies existing in the operating environment space; a movable region estimation unit which estimates a movable region of the mobile body to be controlled; the moving speed estimation device for the mobile body (the moving speed estimation device according to claim 1), wherein the moving speed estimation device is configured so as to be able to estimate a moving speed of each of the mobile bodies and wherein the position measuring unit is configured so as to be able to measure a position of an object existing in the operating environment space including the mobile body; and a moving track control unit which controls a moving track of the mobile body to be controlled, wherein: the future position prediction unit is configured to predict the future position of the mobile body by using the moving speed estimated by the moving speed estimation device with respect to each of the mobile bodies; the movable region estimation unit is configured to estimate a combined region of a region where it is recognized that no object exists from measurement data of the position measuring unit and an existing region of each of the mobile bodies whose moving speed is estimated by the moving speed estimation device, as the movable region, in the operating environment space; and the moving track control unit is configured to control the moving track of the mobile body to be controlled so that the mobile body to be controlled is moved in a region not interfering with an unmovable region which is other than the movable region estimated by the movable region estimation unit and with future positions of other mobile bodies predicted by the future position prediction unit, when the mobile body to be controlled is moved (eighth aspect of the invention).

According to the eighth aspect of the invention, when the mobile body to be controlled is moved in the operating environment space, the mobile body to be controlled is able to be moved so as not to interfere with objects or other mobile bodies. Furthermore, in this case, the future position prediction unit is configured to predict the future position of the mobile body by using the moving speed estimated by the moving speed estimation device with respect to each mobile body, thereby enabling the prediction of the future positions of other mobile bodies other than the mobile body to be controlled with high reliability. Consequently, the mobile body to be controlled is able to be moved without interfering with other mobile bodies with high reliability.

In the above eight aspect of the invention, preferably the movable region estimation unit is configured to determine whether or not an unmeasurable region should be a movable region based on past measurement data with respect to the unmeasurable region, in a case where the unmeasurable region exists, where measurement data is not able to be generated according to a positional relationship between a sensor for generating the measurement data of the position measuring unit and any of the mobile bodies (ninth aspect of the invention).

In this respect, an unmeasurable region where the measurement data cannot be generated exists in some cases according to the positional relationship between the sensor for generating the measurement data on the position measuring unit and one of the mobile bodies.

Even in the above case, according to the ninth invention, the unmeasurable region can be estimated as a movable region by deciding whether or not the unmeasurable region should be a movable region on the basis of the past measurement data with respect to the unmeasurable region. This prevents the movable region from being too small more than necessary. Consequently, it enables an increase in the freedom in setting of the moving track of the mobile body to be controlled.

In the ninth aspect of the invention, the movable region estimation unit may be configured to determine the unmeasurable region as the movable region in a case where the unmeasurable region is able to be estimated as the movable region from latest measurement data among past measurement data, for example, about the unmeasurable region (tenth aspect of the invention).

According thereto, the reliability is able to be increased in deciding the unmeasurable region as a movable region.

DESCRIPTION OF THE PREFERRED EMBODIMENTS

[First Embodiment]

Figure 1:
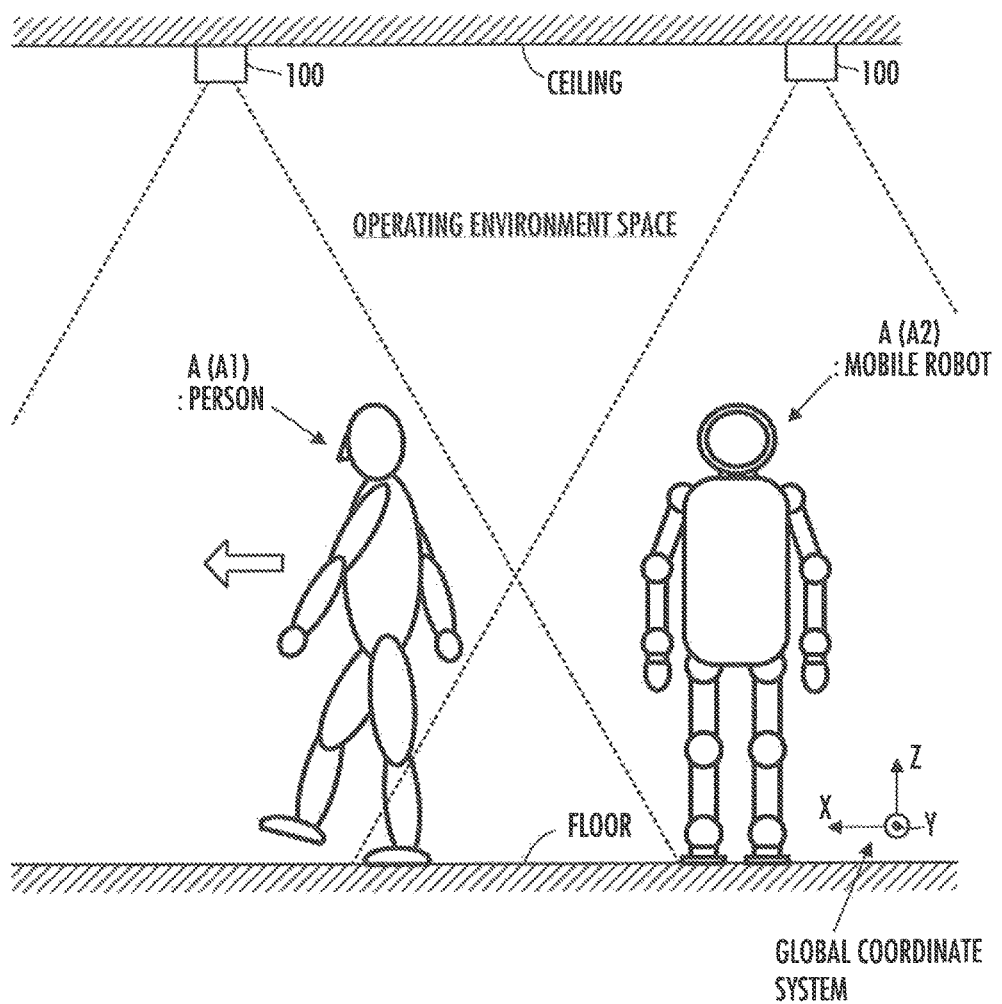
FIG. 1 is a diagram schematically illustrating an operating environment space of a mobile body in one embodiment of the present invention.

Referring to FIGS. 1 to 6, a first embodiment of the present invention will be described below. As illustrated in FIG. 1, a mobile body whose moving speed is to be estimated is a legged mobile body A in this embodiment. FIG. 1 schematically illustrates a person A1 and a humanoid mobile robot A2 as examples of the legged mobile body A. These mobile bodies A move by moving actions (a walking action or a running action) of repeating the movement of each distal end (foot portion) of two legs in the air and subsequent landing thereof.

An operating environment space where these mobile bodies A move is a space where an infrastructure sensor 100 is placed to estimate the position (the existence position in the operating environment space) of each mobile body A or of an object such as an obstacle.

As an example, an infrastructure sensor 100 is, for example, a laser-type range-finding sensor such as a laser range finder. In the present embodiment, a plurality of infrastructure sensors 100 are attached on the ceiling of the operating environment space, for example. In this case, each infrastructure sensor 100 outputs a laser beam in a plurality of directions toward the floor surface within a measurement subject region on the lower front side of the infrastructure sensor 100. Then, the infrastructure sensor 100 receives a reflection signal of the laser beam, thereby outputting a measurement signal of a distance from an object (a reflection point of the laser beam) existing in each output direction of the laser beam.

Naturally, the infrastructure sensor 100 is not limited to the laser-type range-finding sensor. For example, it is also possible to use a radar-type or ultrasonic-type range-finding sensor, a stereo camera, or the like as the infrastructure sensor 100, instead of or in addition to the laser-type range-finding sensor. Moreover, the location where the infrastructure sensor 100 is arranged is not limited to the ceiling, but the infrastructure sensor 100 is able to be set arbitrarily.

Figure 2:
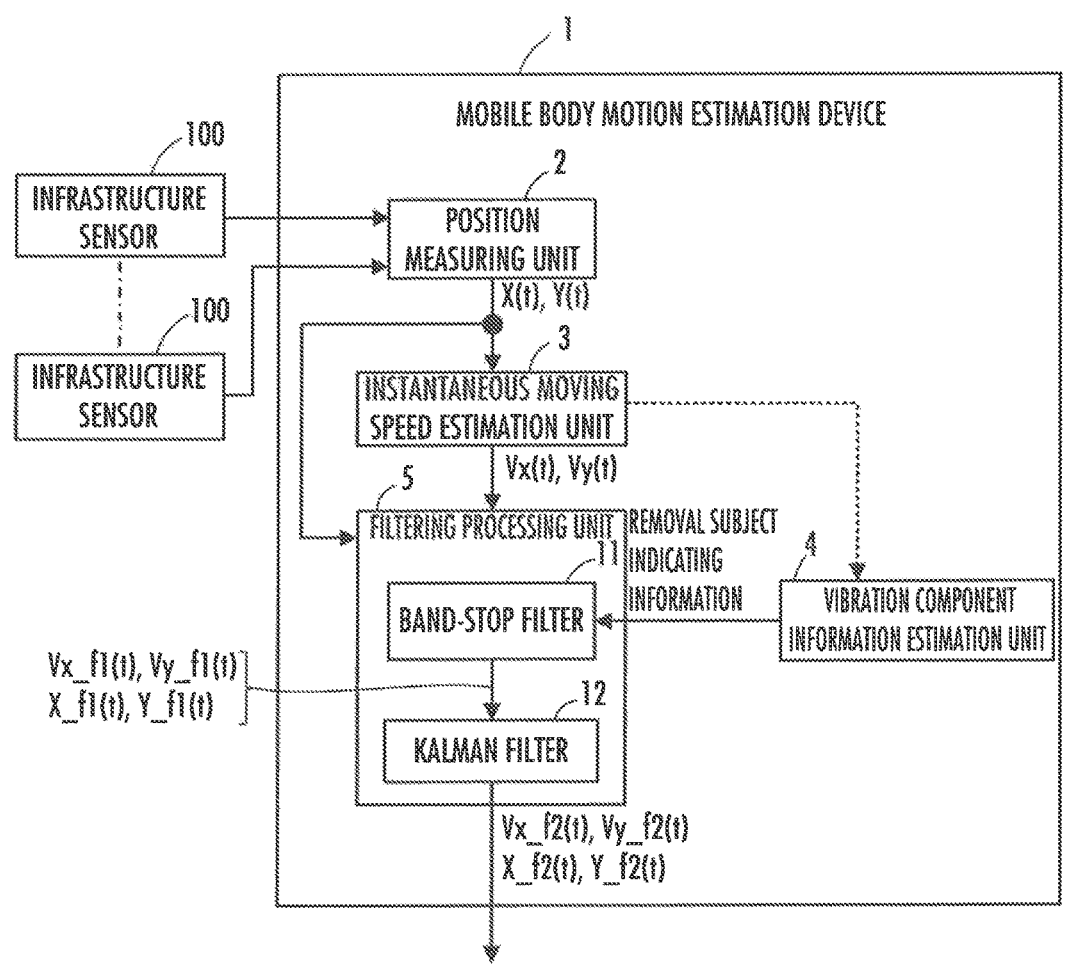
FIG. 2 is a block diagram illustrating the functions of a mobile body motion estimation device in a first embodiment.

The mobile body motion estimation device 1 illustrated in FIG. 2 is a device having the functions of one embodiment of the moving speed estimation device of the present invention. This mobile body motion estimation device 1 is a computer, an electronic circuit unit, or a device of combination thereof. In this case, the mobile body motion estimation device 1 is allowed to include a plurality of computers or a plurality of electronic circuit units capable of communicating with each other.

The mobile body motion estimation device 1 receives an input of the measurement signal of the infrastructure sensor 100. Furthermore, the mobile body motion estimation device 1 includes, as functions implemented by an installed program or a hardware configuration, a position measuring unit 2 which sequentially measures the position of the mobile body A on the basis of the measurement signal of the infrastructure sensor 100, an instantaneous moving speed estimation unit 3 which sequentially estimates the instantaneous moving speed of the mobile body A from the time series of the measured value of the position of the mobile body A obtained by the position measuring unit 2, a vibration component information estimation unit 4 which estimates the vibration frequency (or vibration cycle) of a periodic vibration component included in the time series of the instantaneous moving speed of the mobile body A along with the moving action of the mobile body A, and a filtering processing unit 5 which sequentially generates an estimated value (filtering value) of each of the position and the moving speed of the mobile body A by performing filtering processing of the frequency domain with respect to each of the measured value of the position of the mobile body A obtained by the position measuring unit 2 and the estimated value of the instantaneous moving speed of the mobile body A obtained by the instantaneous moving speed estimation unit 3.

The aforementioned filtering processing unit 5 includes a band-stop filter 11 which performs filtering processing of removing the periodic vibration component corresponding to the estimated value of the vibration frequency (or vibration cycle) obtained by the vibration component information estimation unit 4 and a Kalman filter 12 which performs filtering processing of mainly removing noise components in the high-frequency domain.

The filtering processing unit 5 has the function of performing the filtering processing with respect to the estimated values of the moving speed of the mobile body A, thereby having the function of the speed estimated value adjustment processing unit in the present invention.

Hereinafter, the processing of the respective functional units of the mobile body motion estimation device 1 will be described in more detail.

The position measuring unit 2 acquires range-finding data (data indicating a distance measured value) in each output direction of the laser beam of each infrastructure sensor 100 from the measurement signal of the infrastructure sensor 100 at a predetermined sampling cycle for each infrastructure sensor 100 (a laser-type range-finding sensor in this embodiment). Then, the position measuring unit 2 measures the existence position and height of each mobile body A existing in the operating environment space from the range-finding data by using a technique such as background differentiation.

In the above, in the case where the mobile body A exists in a region where measurement subject regions of the plurality of infrastructure sensors 100 adjacent to each other overlap each other, the position measuring unit 2 integrates the measurement data corresponding to the respective infrastructure sensors 100 to measure the existence position and height of the mobile body A.

In this embodiment, the existence position of the mobile body A is represented as a coordinate position (X(t), Y(t)) of a representative point (for example, a center-of-gravity point) of the mobile body A, viewed by projecting the existence position on a two-dimensional horizontal plane (XY coordinate plane), for example, in a global coordinate system (for example, the XYZ coordinate system illustrated in FIG. 1) previously set for the operating environment space. In addition, the height of the object of the mobile body A is represented as a coordinate position Z(t) of an upper end portion of the mobile body A in the Z-axis direction (vertical direction) of the global coordinate system.

Moreover, as to a more specific technique of the position measurement of the mobile body A, it is possible to adopt a technique suggested by the applicant of the present application in Japanese Patent Application Laid-Open No. 2011-253377, for example.

Supplementarily, the position measuring unit 2 is able to measure not only the position of the mobile body A existing in the operating environment space, but also the position of an object such as an obstacle. In a fifth embodiment described later, the position measuring unit 2 also measures an object other than a mobile body.

Every time the position measuring unit 2 measures the position of each mobile body A, the instantaneous moving speed estimation unit 3 estimates the instantaneous moving speed (Vx(t), Vy(t)) of each mobile body A by dividing a difference (position deviation) between the current measured value (X(t), Y(t)) of the position of each mobile body A and the previous measured value (X(t−Δt), Y(t−Δt)) thereof by a sampling cycle Δt of those measured values.

Specifically, the instantaneous moving speed Vx(t) in the X-axis direction and the instantaneous moving speed Vy(t) in the Y-axis direction are calculated by the following expressions (1a) and (1b).

$$Vx(t)=(X(t)-X(t-\Delta t))/\Delta t \qquad (1a)$$

$$Vy(t)=(Y(t)-Y(t-\Delta t))/\Delta t \qquad (1b)$$

The vibration component information estimation unit 4 previously acquires time-series data as an example of the estimated value of the instantaneous moving speed of each mobile body A (time-series data indicating a change with time of the estimated value of the instantaneous moving speed within a fixed time) from the instantaneous moving speed estimation unit 3. The time-series data is obtained by the processing of the position measuring unit 2 and of the instantaneous moving speed estimation unit 3 when the movement of the mobile body A has been made on a trial basis in order to acquire information on the vibration component included in the instantaneous moving speed of the mobile body A. The vibration component information estimation unit 4, then, generates spectral distribution data by transforming the time-series data of the estimated value of the instantaneous moving speed of each mobile body A into the frequency domain by the Fourier transform processing such as FFT or the like.

Furthermore, the vibration component information estimation unit 4 estimates the vibration frequency (or vibration cycle) of a vibration component to be included in the time series of the instantaneous moving speed of the mobile body A along with the moving action of the mobile body A from the frequency at which the spectral intensity as a peak value in the aforementioned spectral distribution data.

Figure 3A:
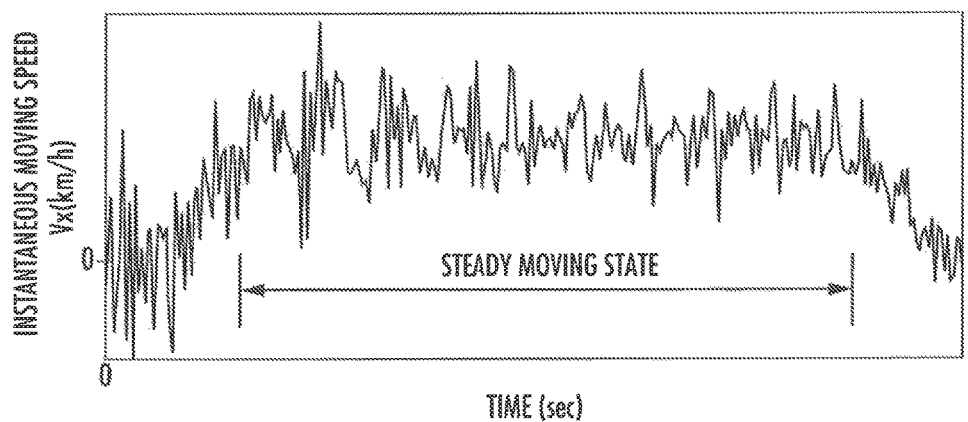
FIG. 3A and FIG. 3B are graphs in which FIG. 3A illustrating an example of a waveform of the instantaneous moving speed of the mobile body and FIG. 3B illustrating spectral distribution data obtained by transforming the waveform in FIG. 3A to a frequency domain.

More specifically, as an example of the time-series data of the estimated value of the instantaneous moving speed in the case where the mobile body A (for example, the person A1) makes straight advance movement from a resting state and thereafter stops the movement, the waveform data (waveform data in the time domain) illustrated in FIG. 3A is obtained. The illustrated waveform data is waveform data of the instantaneous moving speed Vx(t) in the X-axis direction in the case where the mobile body A makes straight advance movement in the X-axis direction.

As found in this waveform data, even in the steady moving state (a state where the moving distance in the moving direction per unit time is substantially constant) after the elapse of a fixed time since the mobile body A starts to move, a short-term fluctuation occurs in the instantaneous moving speed of the mobile body A.

Figure 3B:
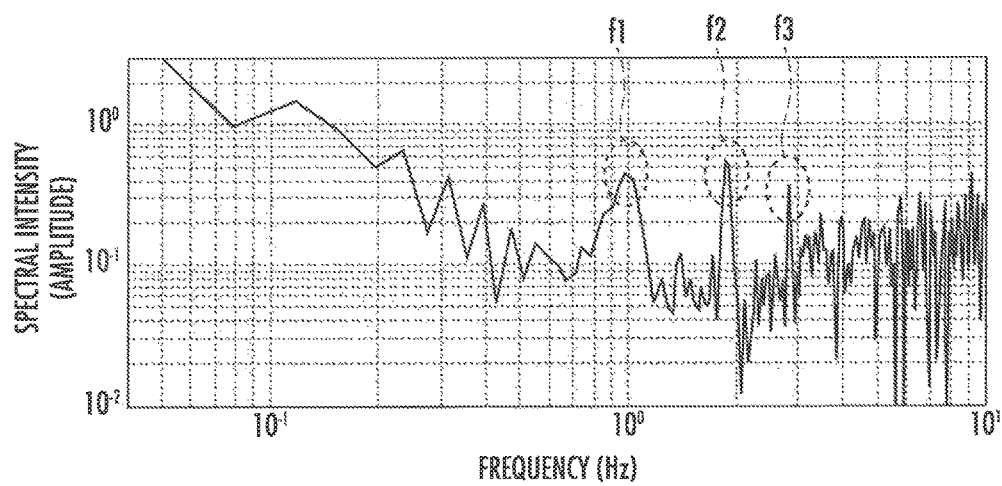

The spectral distribution data of the waveform illustrated in FIG. 3B is obtained by transforming the above waveform data to the frequency domain. In this spectral distribution data, the spectral intensities (vibration amplitude values) at the frequencies f1, f2, and f3 illustrated in FIG. 3B have relatively remarkable peak values as vibration components of the instantaneous moving speed of the mobile body A in the steady moving state.

The frequency f1 is a frequency (for example, 0.9 Hz corresponding to the vibration component of the walking cycle (a time width of a period of two steps) of the mobile body A in the steady moving state, and f2 and f3 are a double frequency and a triple frequency of the frequency f1, respectively. In the moving action of the mobile body A which is a legged mobile body, the time series of the instantaneous moving speed Vx(t) in the moving direction (the X-axis direction in this specification) of the mobile body A generally includes a lot of vibration components of a half cycle (a time width of a period of one step) of the aforementioned walking cycle. The frequency of the vibration components of the half cycle is the above frequency f2.

In this embodiment, the vibration component information estimation unit 4 estimates the frequency f1 which can be considered to correspond to the walking cycle of the mobile body A in the steady moving state from the frequency at which the spectral intensity (vibration amplitude value) has a peak value in the aforementioned spectral distribution data. For example, the vibration component information estimation unit 4 estimates the lowest frequency, among the frequencies at which the spectral intensity has a peak value equal to or greater than a predetermined threshold value in a frequency range of the predetermined threshold value or greater, as the frequency f1 corresponding to the walking cycle of the mobile body A in the steady moving state.

It can be said that the frequency f1 is the vibration component (fundamental wave component) of the lowest frequency among the vibration components included in the time series of the instantaneous moving speed of the mobile body A along with the moving action of the mobile body A in the steady moving state.

Then, the vibration component information estimation unit 4 decides, for example, the frequency f1 and the frequency f2, which is a double frequency thereof, as the frequencies of the vibration components to be removed by the filtering processing unit 5 and then stores and retains the frequencies f1 and f2 (or vibration cycles corresponding to the frequencies) in a memory not illustrated.

The vibration component information estimation unit 4 estimates the frequency f1 corresponding to the walking cycle of the mobile body A as described above and further performs processing of deciding the frequencies f1 and f2 of the vibration components to be removed by the filtering processing unit 5 in advance.

Then, when the mobile body motion estimation device 1 performs the actual estimation processing or the like (more specifically, the processing of the filtering processing unit 5) of the moving speed of the mobile body A, the vibration component information estimation unit 4 outputs the frequencies f1 and f2 (or vibration cycles corresponding to the frequencies) decided as described above as removal subject indicating information indicating the frequencies of the vibration components to be removed to the filtering processing unit 5.

Supplementarily, the removal subject indicating information output to the filtering processing unit 5 by the vibration component information estimation unit 4 only needs to be information by which the filtering processing unit 5 is able to identify the frequencies (or vibration cycles) of the vibration components to be removed by a band-stop filter 11 described later.

In the following description, the aforementioned frequency f1 and the frequency f2, which is a double frequency thereof, will be referred to as "first vibration frequency f1" and "second vibration frequency f2," respectively.

The filtering processing unit 5 performs filtering processing with the band-stop filter 11 and filtering processing with the Kalman filter 12 for the estimated values Vx(t), Vy(t) of the instantaneous moving speed of each mobile body A sequentially input from the instantaneous moving speed estimation unit 3 and for the measured values X(t), Y(t) of the position of each mobile body A sequentially input from the position measuring unit 2.

In this regard, the filtering processing unit 5 of this embodiment removes the vibration components of the aforementioned first vibration frequency f1, which is indicated by the removal subject indicating information of the vibration component information estimation unit 4, and the vibration components of the second vibration frequency f2(=2•f1), which is indicated by the removal subject indicating information, from the instantaneous moving speed and position of each mobile body A by using the band-stop filter 11.

Furthermore, the filtering processing unit 5 removes noise components (including the frequency f3, which is the triple frequency of the first vibration frequency f1) in the higher frequency domain than the second vibration frequency f2 by using the Kalman filter 12.

Therefore, the band-stop filter 11 includes a first band-stop filter 11a (not illustrated) for removing the vibration components of the first vibration frequency f1 and a second band-stop filter 11b (not illustrated) for removing the vibration components of the second vibration frequency f2.

Figure 4:
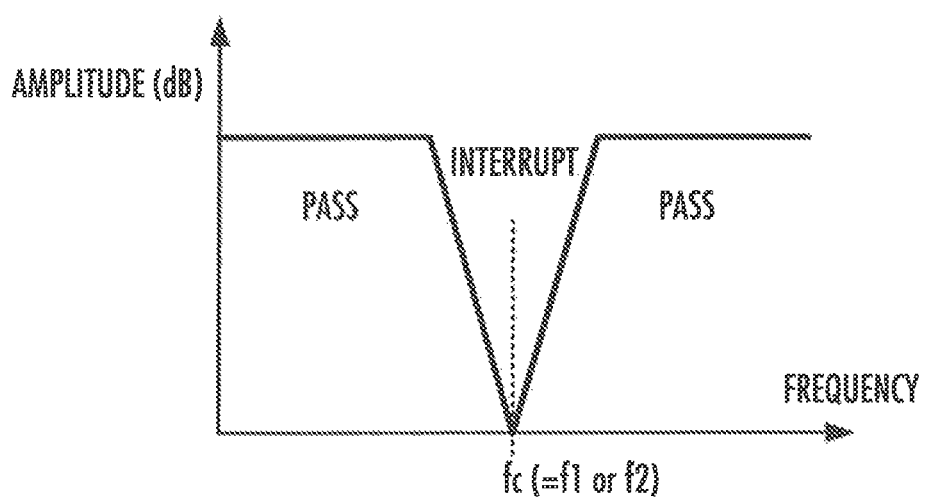
FIG. 4 is a graph illustrating an example of characteristics of a band-stop filter illustrated in FIG. 2.

Each of the first band-stop filter 11a and the second band-stop filter 11b is configured to remove a removal subject frequency fc(=f1 or f2), for example, with frequency pass characteristics as illustrated in FIG. 4. In this case, the frequency pass characteristics of the first band-stop filter 11a and those of the second band-stop filter 11b are set in such a way that the amplitude attenuation degree (the attenuation degree of the output intensity to the input intensity) at the removal subject frequency fc reaches a peak.

The above characteristics are achieved by setting the transfer function G(S) of each of the band-stop filters 11a and 11b by using the following expression (2):

$$G(S)=(S^2+\omega c^2)/(S^2+2\cdot\zeta\cdot\omega c\cdot S+\omega c^2) \quad (2)$$

where $\omega c=2\cdot\pi\cdot fc$ and $\zeta$ is a constant value.

Furthermore, in the case where each of the band-stop filters 11a and 11b is configured as a digital filter, the transfer function G(Z) is given by the following expression (3) on the basis of the expression (2).

$$G(Z)=(b0+b1\cdot Z^{-1}+b2\cdot Z^{-2})/(a0+a1\cdot Z^{-1}+a2\cdot Z^{-2}) \quad (3)$$

where $$a0=\omega c\cdot\Delta t^2+4\cdot\zeta\cdot\omega c\cdot\Delta t+4$$

$$a1=2\cdot\omega c^2\cdot\Delta t^2-8$$

$$a2=\omega c\cdot\Delta t^2+4\cdot\zeta\cdot\omega c\cdot\Delta t+4$$

$$b0=\omega c\cdot\Delta t^2+2\cdot\Delta t$$

$$b1=2\cdot\omega c^2\cdot\Delta t^2$$

$$b2=\omega c\cdot\Delta t^2-2\cdot\Delta t$$

where $\Delta t$ is a sampling cycle.

The filtering processing unit 5 performs the filtering processing of the first band-stop filter 11a and the second band-stop filter 11b configured as described above for the estimated values (Vx(t), Vy(t)) of the instantaneous moving speed of each mobile body A sequentially input from the instantaneous moving speed estimation unit 3 and for the measured values (X(t), Y(t)) of the position of each mobile body A sequentially input from the position measuring unit 2. Thus, there are sequentially obtained the filtering values Vx_f1(t), Vy_f1(t) and X_f1(t), Y_f1(t) which are obtained by removing the vibration components of the first vibration frequency f1 and the vibration components of the second vibration frequency f2 from the estimated values Vx(t), Vy(t) of the instantaneous moving speed of each mobile body A and from the measured values X(t), Y(t) of the position of each mobile body A.

The filtering processing unit 5 then further performs filtering processing with the Kalman filter 12 for these filtering values Vx_f1(t), Vy_f1(t) and X_f1(t), Y_f1(t). In this case, the Kalman filter 12 is configured to remove noise components in the higher frequency domain than the second vibration frequency f2 as described above. This type of Kalman filter 12 is able to be configured in a publicly-known mode.

By the filtering processing with the Kalman filter 12, the filtering values Vx_f2(t), Vy_f2(t) and X_f2(t), Y_f2(t) are sequentially obtained by further removing noise components in the high-frequency domain from the filtering values Vx_f1(t), Vy_f1(t) and X_f1(t), Y_f1(t) generated by the aforementioned band-stop filter 11.

The above is the details of the processing of the respective functional units of the mobile body motion estimation device 1 in this embodiment.

In this embodiment, the filtering processing with the band-stop filter 11 and the filtering processing with the Kalman filter 12 are performed for the estimated values (Vx(t), Vy(t)) of the instantaneous moving speed of the mobile body A and for the measured values (X(t), Y(t)) of the position of the mobile body A, thereby enabling effective removal of the vibration components of the first vibration frequency f1 and the second vibration frequency f2 included in the time series of the Vx(t), Vy(t), X(t), and Y(t) generated along with the moving action of the mobile body A and of noise components on the high-frequency side.

Therefore, the vibration components are effectively suppressed with respect to the estimated values Vx_f2(t), Vy_f2(t) of the moving speed and the estimated values X_f2(t), Y_f2(t) of the position of the mobile body A output from the filtering processing unit 5, particularly the estimated values Vx_f2(t), Vy_f2(t) of the moving speed.

Figure 5:
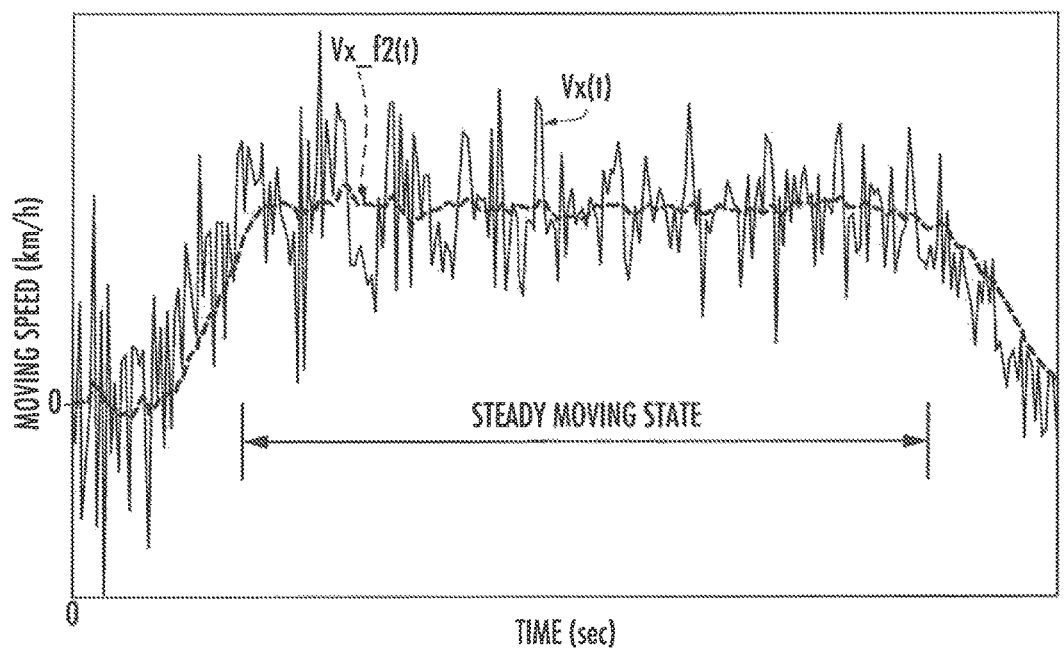
FIG. 5 is a graph exemplifying the waveform of an estimated value of the instantaneous moving speed input to a filtering processing unit illustrated in FIG. 2 and the waveform of an estimated value of the moving speed output from the filtering processing unit.

For example, as illustrated in FIG. 5, in the case where the mobile body A (the person A1 in this specification) is made to advance straight in the X-axis direction, the waveform (a solid-line graph) of the estimated value Vx(t) of the instantaneous moving speed includes relatively large short-term fluctuations even in the steady moving state. Whereas, the waveform (a broken-line graph) of the estimated value Vx_f2(t) of the moving speed after the filtering processing of the filtering processing unit 5 is a smooth waveform. Particularly, in the steady moving state of the mobile body A, the value Vx_f2(t) is maintained substantially constant.

Figure 6A:
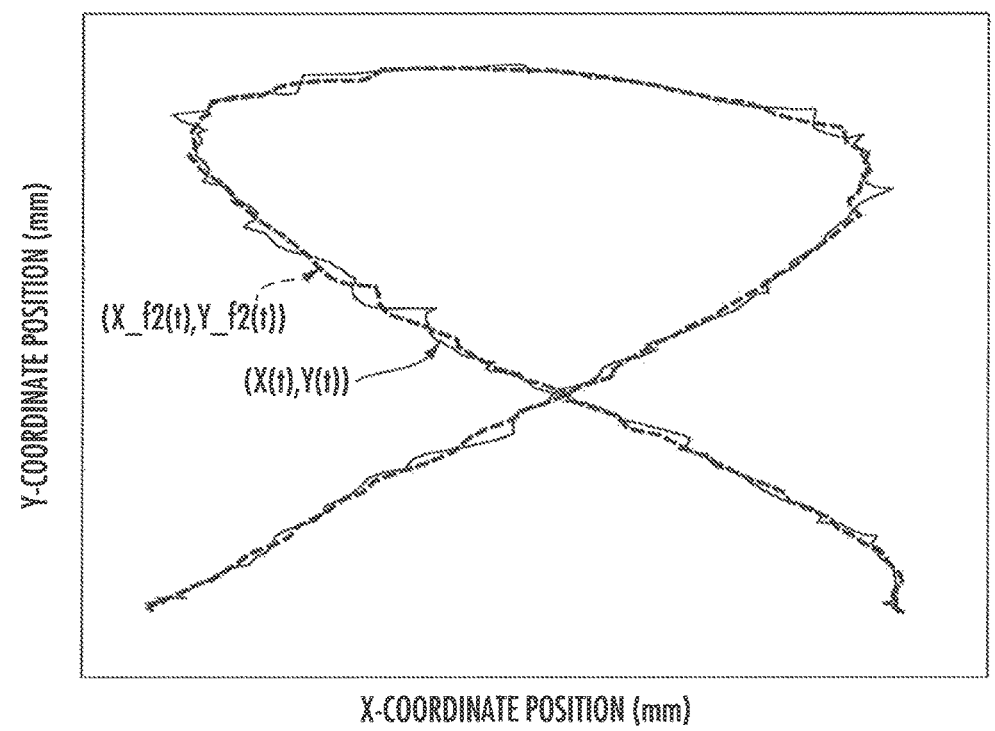
FIG. 6A, FIG. 6B, and FIG. 6C are graphs in which FIG. 6A exemplifying a path corresponding to a measured value of a position input to the filtering processing unit illustrated in FIG. 2 and a path corresponding to an estimated value of a position output from the filtering processing unit, FIG. 6B exemplifying a waveform of an estimated value of an instantaneous moving speed in the X-axis direction input to the filtering processing unit illustrated in FIG. 2 and a waveform of an estimated value of a moving speed in the X-axis direction output from the filtering processing unit, and FIG. 6C exemplifying a waveform of an estimated value of an instantaneous moving speed in the Y-axis direction input to the filtering processing unit illustrated in FIG. 2 and a waveform of an estimated value of a moving speed in the Y-axis direction output from the filtering processing unit.
Figure 6B:
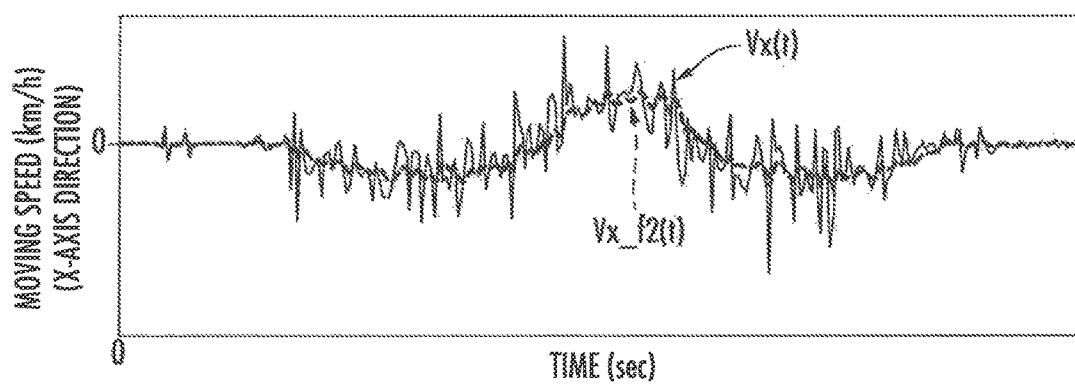
Figure 6C:
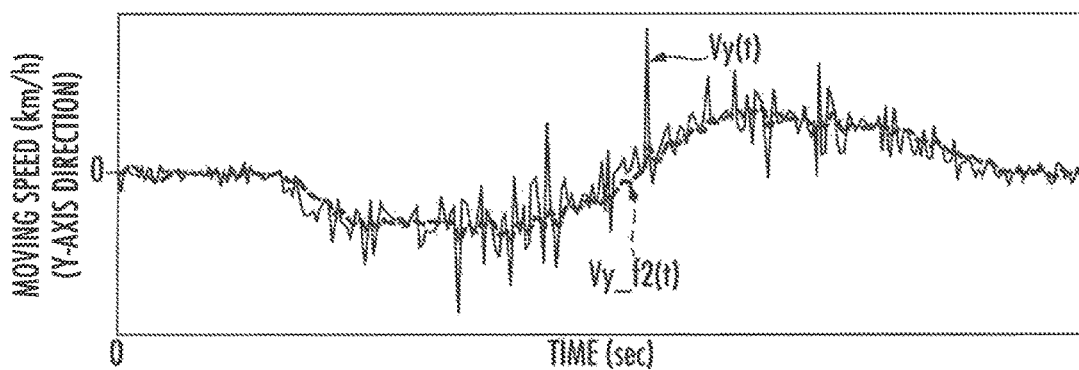

Moreover, for example, in the case where the mobile body A (the person A1 in this specification) is moved on a path in the shape of a figure eight as illustrated in FIG. 6A, the locus of the measured values (X(t), Y(t)) of the position of the mobile body A, the waveform of the estimated value Vx(t) of the instantaneous moving speed in the X-axis direction, and the waveform of the estimated value Vy(t) of the instantaneous moving speed in the Y-axis direction include remarkable local or short-term fluctuations as represented by the solid-line graphs in FIGS. 6A, 6B, and 6C.

Whereas, the locus of the estimated values (X_f2(t), Y_f2(t)) of the position of the mobile body A after the filtering processing of the filtering processing unit 5, the waveform of the estimated value Vx_f2(t) of the moving speed in the X-axis direction of the mobile body A, and the waveform of the estimated value Vy_f2(t) of the moving speed in the Y-axis direction smoothly change as represented by the broken-line graphs in FIGS. 6A, 6B, and 6C.

Furthermore, the filtering processing unit 5 removes the vibration component of the first vibration frequency f1 included in the time series of the instantaneous moving speed of the mobile body A along with the moving action of the mobile body A and the vibration component of the second vibration frequency f2 by using the band-stop filter 11, thereby enabling the estimated values Vx_f2(t), Vy_f2(t) of the moving speed after the filtering processing to follow the change (change in the center value) in the estimated values Vx(t), Vy(t) of the instantaneous moving speed with high followability, as apparent from FIGS. 5, 6B, or 6C.

[Second Embodiment]

Subsequently, a second embodiment of the present invention will be described with reference to FIGS. 7 to 9. This embodiment differs from the first embodiment only in the processing of the vibration component information estimation unit 4 and in the processing of the band-stop filter 11 in the filtering processing unit 5. Therefore, the description will be omitted with respect to the same matters as in the first embodiment.

In this embodiment, the first band-stop filter 11a and the second band-stop filter 11b are configured so as to remove also vibration components of the frequencies in the vicinity of the first vibration frequency f1 and in the vicinity of the second vibration frequency f2 when removing the vibration components of the first vibration frequency f1 and the second vibration frequency f2 by using the first band-stop filter 11a and the second band-stop filter 11b, respectively.

Figure 7:
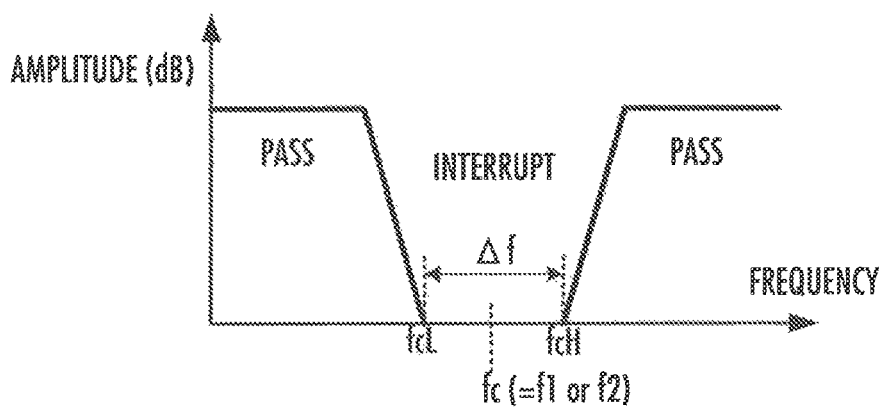
FIG. 7 is a graph illustrating an example of characteristics of a band-stop filter in a second embodiment.

More specifically, in this embodiment, each of the first band-stop filter 11a and the second band-stop filter 11b is configured as a filter which removes vibration components in a predetermined bandwidth Δf (a frequency width in a range of fcH to fcL) around the removal subject frequency fc(=f1 or f2) from the estimated values Vx(t), Vy(t) of the instantaneous moving speed of the mobile body A and the measured values X(t), Y(t) of the position of the mobile body A, for example, with the characteristics as illustrated in FIG. 7.

In this case, the limit value on the low-frequency side (the lower-limit value) fcL and the limit value on the high-frequency side (the upper-limit value) fell in the bandwidth Δf corresponding to each removal subject frequency fc=f1 or f2 are previously decided on the basis of the spectral distribution data by the vibration component information estimation unit 4 so that the spectral intensity (the spectral intensity in the spectral distribution data described in the first embodiment) in the bandwidth Δf is relatively close to the spectral intensity (peak value) in the removal subject frequency fc.

Figure 8:
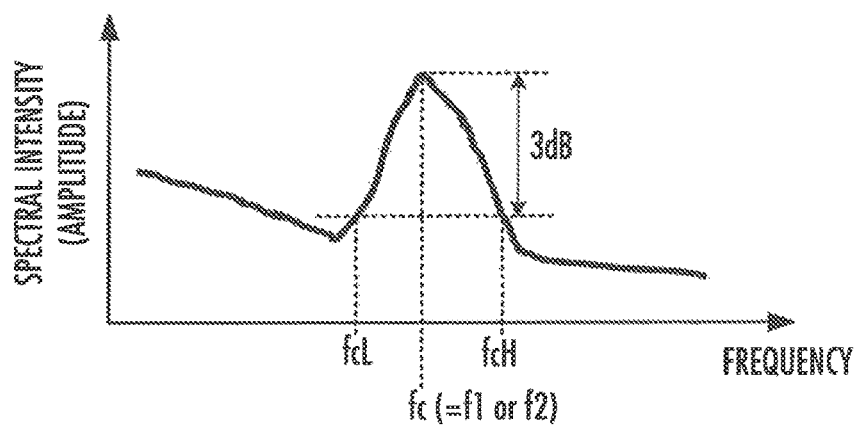
FIG. 8 is a graph for explaining a setting method of a characteristic value of the band-stop filter in the second embodiment.

As an example, for example, as illustrated in FIG. 8, the frequencies fcL and fcH on both sides of the removal subject frequency fc(=f1 or f2) are able to be decided as the lower-limit value and the upper-limit value of the aforementioned bandwidth Δf, where the frequencies fcL and fcH are each lower in the spectral intensity by 3 dB from the spectral intensity at the removal subject frequency fc in the spectral distribution data.

Alternatively, it is also possible to decide the frequencies fcL and fcH so as to satisfy, for example, fcL=fc−Δt/2 and fcH=fc+Δf/2.

In addition, the vibration component information estimation unit 4 outputs the information indicating the bandwidth Δf decided as described above as the removal subject indicating information to the filtering processing unit 5. The removal subject indicating information in this case is able to be composed of, for example, a pair of the lower-limit value and upper-limit value of the bandwidth Δf corresponding to the removal subject frequency fc(=f1 or f2), a pair of the size of the bandwidth Δf (=upper-limit value−lower-limit value) and the frequency at the median of the bandwidth Δf, or the like.

Moreover, the filtering processing unit 5 sets the frequency pass of each of the band-stop filters 11a and 11b so that the first band-stop filter 11a and the second band-stop filter 11b function as filters which remove the vibration components in the bandwidth Δf (the bandwidth Δf corresponding to each of the frequencies f1 and f2) indicated by the vibration component information supplied from the vibration component information estimation unit 4.

Figure 9:
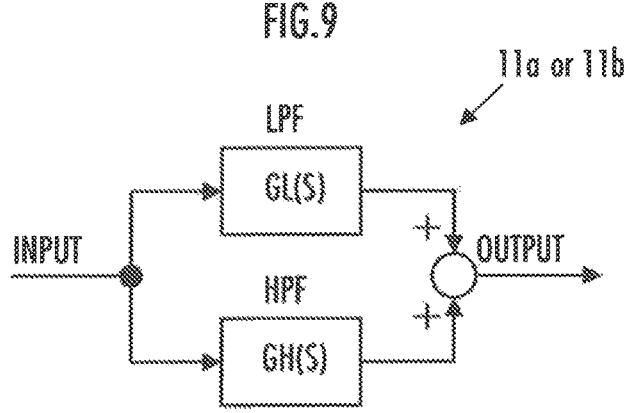
FIG. 9 is a block diagram illustrating a configuration example of the band-stop filter in the second embodiment.

Each of the first band-stop filter 11a and the second band-stop filter 11b is able to be formed by combining a low-pass filter LPF and a high-pass filter HPF, for example, as illustrated in FIG. 9.

In this case, the transfer function GL(S) of the low-pass filter LPF and the transfer function GH(S) of the high-pass filter HPF can be set by, for example, the following expressions (5a) and (5b), respectively.

$$GL(S)=\omega cL^2/(S^2+2\cdot\zeta\cdot\omega cL\cdot S+\omega cL^2) \quad (5a)$$

$$GH(S)=S^2/(S^2+2\cdot\zeta\cdot\omega cH\cdot S+\omega cH^2) \quad (5b)$$

where $\omega cL=2\cdot\pi\cdot fcL$, $\omega cH=2\cdot\pi\cdot fcH$, and $\zeta$ is a constant value.

In this embodiment, the filtering processing unit 5 sequentially performs the filtering processing with the first band-stop filter 11a and the second band-stop filter 11b configured as described above for the estimated values Vx(t), V(t) of the instantaneous moving speed of the mobile body A and the measured values X(t), Y(t) of the position of the mobile body A.

Thereby, the vibration components of the frequency in the bandwidth Δf including the first vibration frequency f1 and the vibration components of the frequency in the bandwidth Δf including the second vibration frequency f2 are removed from the time series of Vx(t), Vy(t) and X(t), Y(t).

This embodiment is the same as the first embodiment except the above-described matters.

This embodiment is also able to provide the same advantageous effects as those of the first embodiment. Moreover, even if the frequency corresponding to an actual walking cycle of the mobile body A slightly deviates from the first vibration frequency f1 decided by the vibration component information estimation unit 4, it is possible to remove the vibration components of the frequency corresponding to the actual walking cycle of the mobile body A and the vibration components of a double frequency of the foregoing frequency with high reliability.

[Third Embodiment]

Subsequently, a third embodiment of the present invention will be described with reference to FIG. 10. This embodiment differs from the first embodiment only in the processing of the vibration component information estimation unit 4 and in the processing of the band-stop filter 11 in the filtering processing unit 5. Therefore, the description will be omitted with respect to the same matters as in the first embodiment.

Figure 10:
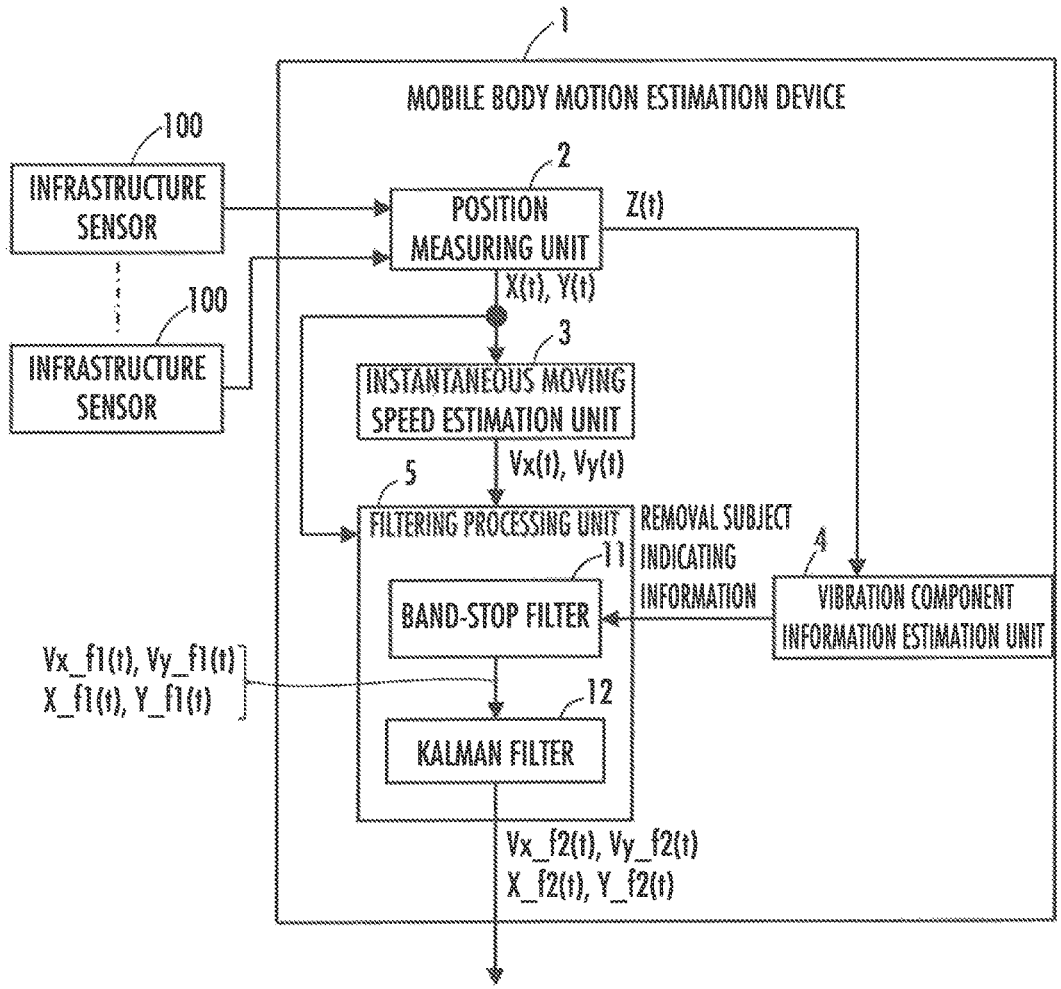
FIG. 10 is a block diagram illustrating the functions of a moving speed estimation device in a third embodiment.

Referring to FIG. 10, in this embodiment, the vibration component information estimation unit 4 sequentially receives inputs of measured values Z(t) of the height (the position in the Z-axis direction) of the mobile body A from the position measuring unit 2.

It should be noted here that the legged mobile body A such as a person A1 or the like vertically moves (vertically vibrates) in the upper body or base of the mobile body A in response to the moving action of the mobile body Am the vibration frequency of the height of the mobile body A coincides with a double vibration frequency (=the second vibration frequency f2) the first vibration frequency f1 corresponding to the walking cycle of the mobile body A.

Therefore, in this embodiment, the vibration component information estimation unit 4 estimates a vibration frequency, which is a half of the vibration frequency (or vibration cycle) of the height of the mobile body A, as the first vibration frequency f1, from the time series of the measured value Z(t) of the height (the position in the Z-axis direction) of the mobile body A at regular time intervals. In this case, the vibration frequency (or the vibration cycle) of the height of the mobile body A can be estimated, for example, from the spectral distribution data obtained by Fourier-transforming the time series of the measured value Z(t). Alternatively, it is also possible to estimate the time interval between a time from reaching the peak value until reaching the next peak value in the measured value Z(t) and to estimate the vibration frequency (or vibration cycle) of the height of the mobile body A from the estimated value of the time interval.

Furthermore, the vibration component information estimation unit 4 outputs the removal subject indicating information, which indicates the first vibration frequency f1 estimated as described above and the vibration frequency f2 which is a double of the first vibration frequency f1 as the frequencies of the vibration components to be removed, to the filtering processing unit 5.

In this embodiment, the vibration component information estimation unit 4 outputs the previously determined removal subject indicating information (provisional estimated values or the like of the first vibration frequency f1 and the second vibration frequency f2) in a state where the vibration frequency (or vibration cycle) of the height of the mobile body A is not estimated yet immediately after the mobile body A starts to move.

This embodiment is the same as the first embodiment except the above-described matters.

This embodiment is also able to provide the same advantageous effects as those of the first embodiment. Moreover, the frequencies f1 and f2 of the vibration components to be removed by the band-stop filter 11 are periodically updated so as to fit to an actual moving state of the mobile body A, and therefore the present invention is able to change the frequencies of the vibration components to be removed according to changes in the moving state of the mobile body A.

[Fourth Embodiment]

Subsequently, a fourth embodiment of the present invention will be described. This embodiment differs from the first embodiment only in the processing of the vibration component information estimation unit 4 and in the processing of the band-stop filter 11 in the filtering processing unit 5. Therefore, the description will be omitted with respect to the same matters as in the first embodiment.

Figure 11:
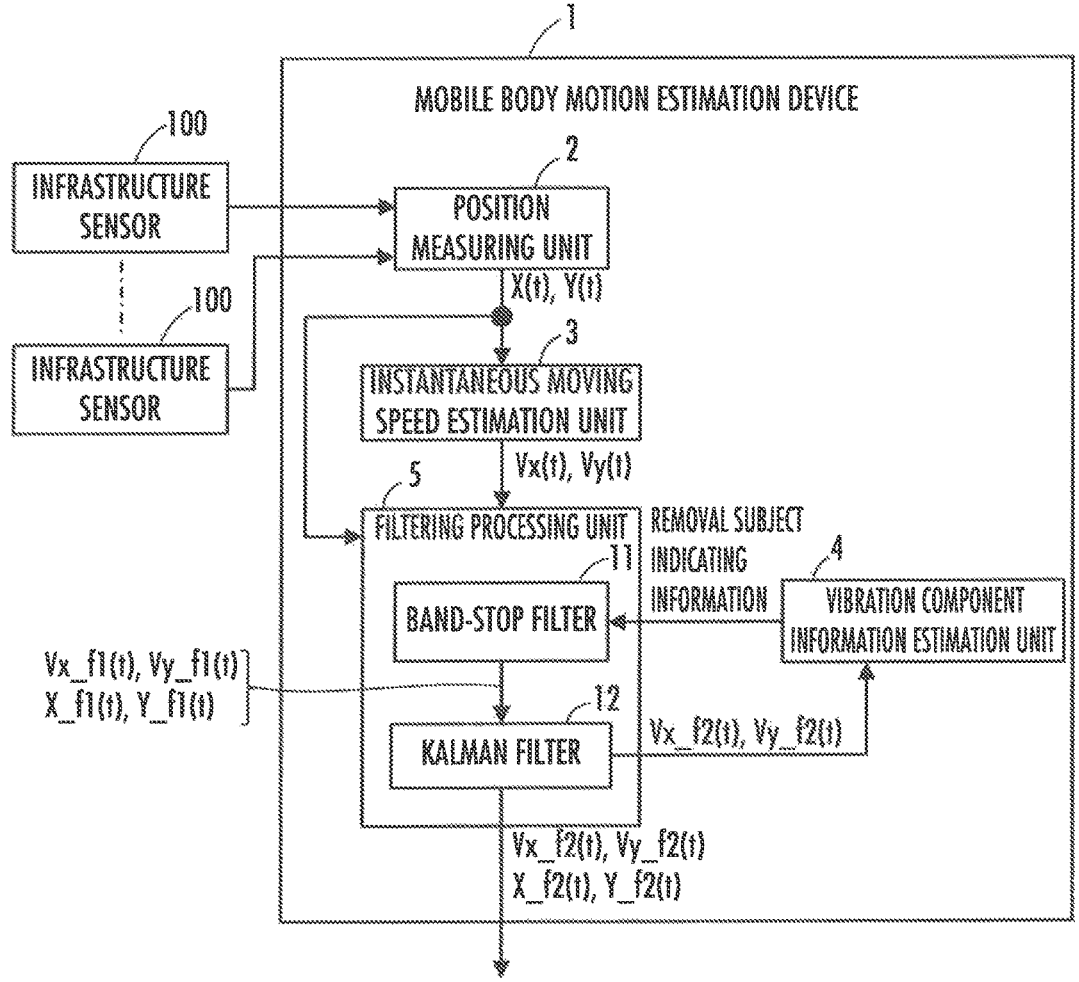
FIG. 11 is a block diagram illustrating the functions of a moving speed estimation device in a fourth embodiment.

Referring to FIG. 11, in this embodiment, the vibration component information estimation unit 4 sequentially receives a feedback of the estimated values $Vx\_f2(t)$, $Vy\_f2(t)$ of the moving speed of the mobile body A output from the filtering processing unit 5. Then, the vibration component information estimation unit 4 estimates the first vibration frequency f1 (or vibration cycle corresponding thereto) by using correlation data previously created as correlation data indicating the relationship between the magnitude of the moving speed of the mobile body A and the walking cycle or the vibration frequency corresponding thereto (specifically, the first vibration frequency f1) from the fed-back $Vx\_f2(t)$, $Vy\_f2(t)$.

In this regard, for example, if the mobile body A is the person A1, the relationship between the first vibration frequency f1 corresponding to the walking cycle and the magnitude |V| of the moving speed in the moving direction of the mobile body A can be approximately represented by the following expression (6).

$$f1=(2 \cdot |V|-239)/183 \quad (6)$$

where the unit of f1 is [Hz] and the unit of |V| is [m/min].

Therefore, the vibration component information estimation unit 4 sequentially calculates the first vibration frequency f1 corresponding to the walking cycle of the mobile body A by calculating the magnitude |V| of the estimated values $Vx\_f2(t)$, $V\_f2(t)$ of the moving speed of the mobile body A having been fed back and computing the above expression (6) from the calculated value of the magnitude |V|. Then, the vibration component information estimation unit 4 sequentially outputs removal subject indicating information indicating the first vibration frequency f1 calculated as described above and the vibration frequency f2 which is a double of the first vibration frequency f1 to the filtering processing unit 5.

In this case, similarly to the first embodiment, the band-stop filter 11 of the filtering processing unit 5 performs the filtering processing for the vibration components of the first vibration frequency f1 defined by the removal subject indicating information and the vibration components of the second vibration frequency f2 which is a double frequency of the first vibration frequency f1 as removal subjects.

Incidentally, the vibration component information estimation unit 4 outputs the removal subject indicating information indicating given provisional estimated values of the first vibration frequency f1 and the second vibration frequency f2 to the filtering processing unit 5 until the estimated values $Vx\_f2(t)$, $Vy\_f2(t)$ of the moving speed of the mobile body A output from the filtering processing unit 5 are stabilized.

Also in this embodiment, the present invention is able to provide the same advantageous effects as those of the first embodiment. Moreover, the vibration component information estimation unit 4 is able to immediately obtain the first vibration frequency f1 corresponding to the walking cycle of the mobile body A without performing the Fourier transform processing or the like, and therefore the present invention is able to change the frequencies of the vibration components to be removed with the band-stop filter 11 with quick response adapted to changes in the moving state of the mobile body A.

[Fifth Embodiment]

Subsequently, one embodiment of a control device for a mobile body of the present invention will be described as a fifth embodiment. In this embodiment, in an operating environment space in which a plurality of mobile bodies such as a person, a mobile robot, or the like move, an actuator controls the movement of the mobile body (for example, a mobile robot) to be controlled which performs a moving action.

In this embodiment, the aforementioned operating environment space is a space where the infrastructure sensor 100 is placed as illustrated in FIG. 1. The mobile body to be controlled is, for example, the legged mobile robot A2 illustrated in FIG. 1. The mobile body to be controlled, however, is not limited to the legged mobile robot A2, but may be, for example, a wheel-type traveling body or the like.

Figure 12:
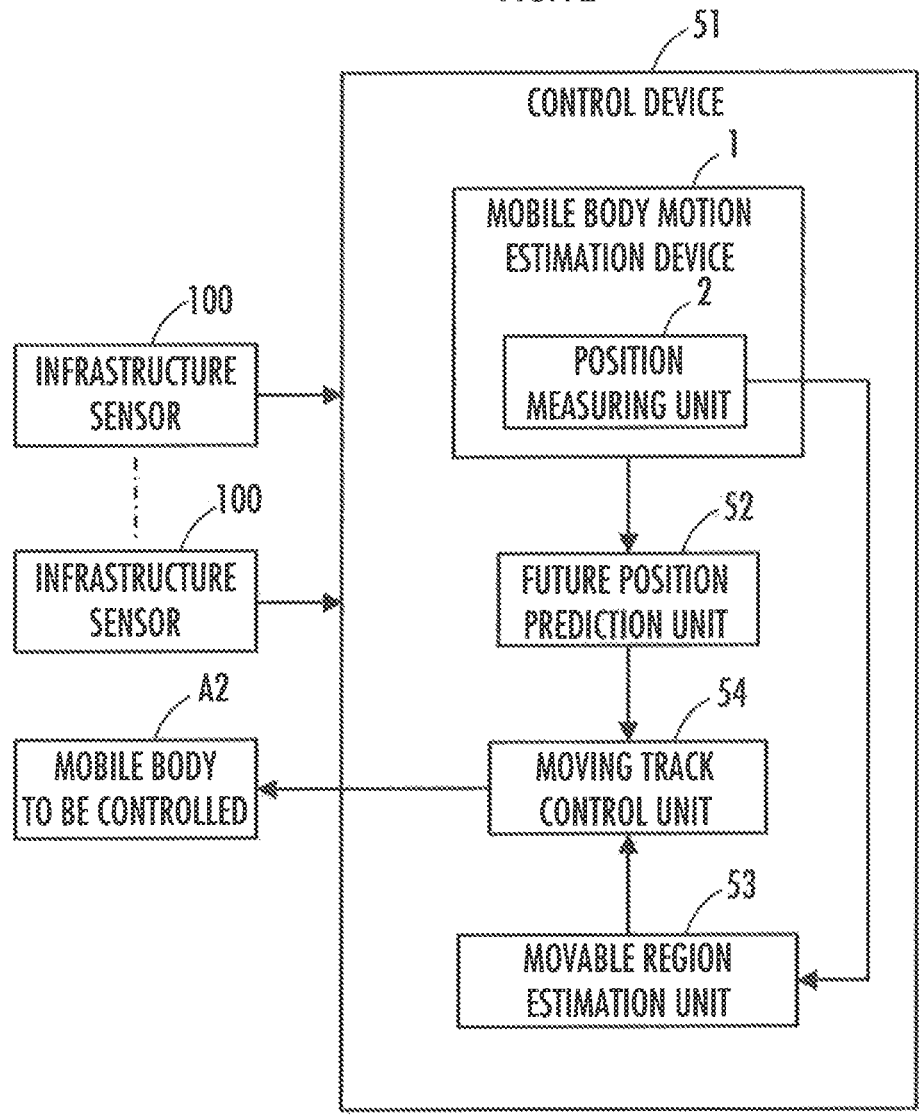
FIG. 12 is a block diagram illustrating the functions of a control device in one embodiment (a fifth embodiment) of the control device of a mobile body.

FIG. 12 illustrates a control device 51 in this embodiment. The control device 51 is composed of a computer, an electronic circuit unit, or a device including a combination thereof. In this case, the control device 51 may include a plurality of computers or a plurality of electronic circuit units operable in mutual cooperation with each other.

The control device 51 receives inputs of measurement signals from the infrastructure sensor 100. Then, the control device 51 includes, as functions implemented by installed programs or hardware configuration, a mobile body motion estimation device 1 which is a functional unit for estimating a moving speed or the like of each mobile body existing in the operating environment space, a future position prediction unit 52 which predicts a future position of each mobile body, a movable region estimation unit 53 which estimates a movable region where the mobile body A2 to be controlled is allowed to be moved in the operating environment space, and a moving track control unit 54 which controls the moving track of the mobile body A2 so as not to interfere with an obstacle or any other mobile body.

The mobile body motion estimation device 1 may be configured according to any of the first to fourth embodiments.

The future position prediction unit 52 predicts the future position of each mobile body A by using estimated values $Vx\_f2(t)$, $Vy\_f2(t)$ of the moving speed and estimated values $X\_f2(t)$, $Y\_f2(t)$ of the position of the mobile body A sequentially generated as described above by the mobile body motion estimation device 1.

Specifically, the future position prediction unit 52 predicts the future position (X(t+ΔT), Y(t+ΔT)) of the mobile body A after the elapse of an arbitrary time ΔT from the current time t, for example, by using the following expressions (10a) and (10b) for each mobile body A.

$$X(t+\Delta T)=X\_f2(t)+\Delta T \cdot Vx\_f2(t) \quad (10a)$$

$$Y(t+\Delta T)=Y\_f2(t)+\Delta T \cdot Vy\_f2(t) \quad (10b)$$

In this example, the future position prediction unit 52 predicts the future position of the mobile body A considering that the mobile body A moves while maintaining the speed vector defined by the estimated values Vx_f2(t), Vy_f2(t) of the current moving speed in the X-axis direction and in the Y-axis direction of the global coordinate system.

The future position prediction unit 52 may predict the future position of the mobile body A so as to reflect, for example, the history of the position or the moving speed of the mobile body A in a certain period of tune before the current time on the future position. For example, the future position prediction unit 52 may predict the future position of the mobile body A so that the moving path of the mobile body A after the current time is curved with being fit to the curvature of the moving path for a certain period of tune before the current time. Alternatively, the future position prediction unit 52 may predict the future position of the mobile body A so that the mobile body A is accelerated or decelerated after the current time according to the moving acceleration or moving deceleration of the mobile body A for a certain period of time before the current time.

The movable region estimation unit 53 estimates an obstacle existing region (excluding the existing regions of the respective mobile bodies A) on the basis of the range-finding data obtained from the infrastructure sensor 100 and estimates the region other than the obstacle existing region as the movable region of the mobile body A2 to be controlled.

Figure 13:
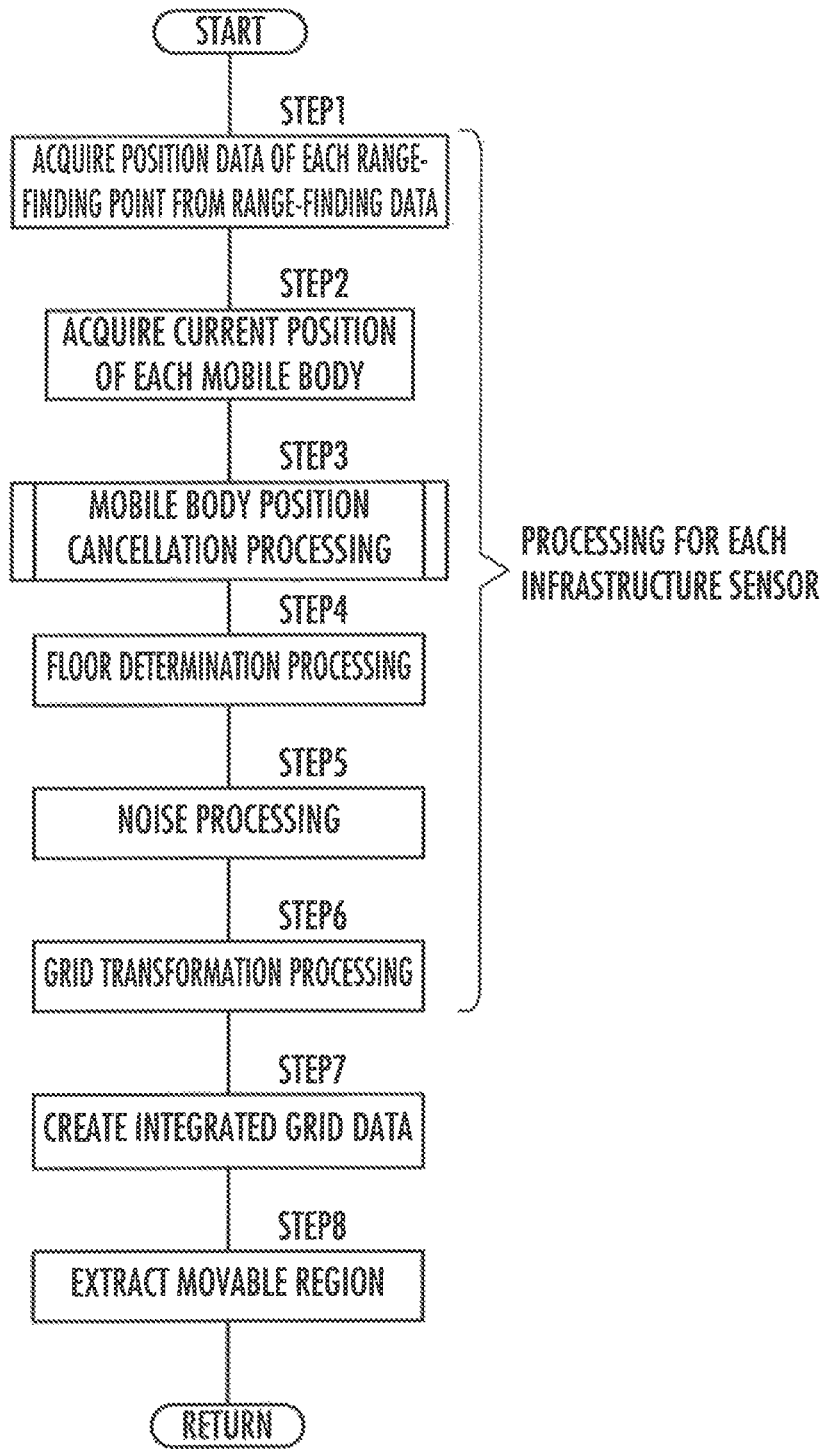
FIG. 13 is a flowchart illustrating the processing of a movable region estimation unit illustrated in FIG. 12.

The processing of the movable region estimation unit 53 is performed as described below. The movable region estimation unit 53 performs the processing illustrated in the flowchart of FIG. 13 at a predetermined arithmetic processing cycle. In the description below, a point (a reflection point of a laser beam) where range-finding data is obtained in each output direction of the laser beam of each infrastructure sensor 100 (the laser-type range-finding sensor in this embodiment) is referred to as a range-finding point. Each range-finding point is associated with each output direction of the laser beam.

The movable region estimation unit 53 performs the processing of STEPS 1 to 6 for each infrastructure sensor 100.

In STEP1, the movable region estimation unit 53 acquires position data of each range-finding point (a measured value at a position viewed in the global coordinate system, which is hereinafter referred to as "measurement position data") of the infrastructure sensor 100 from the position measuring unit 2 of the mobile body motion estimation device 1.

In this case, the measurement position data is generated by the position measuring unit 2, for example, as described below. Specifically, the position of the range-finding point viewed in the sensor coordinate system, which has been set for the infrastructure sensor 100, is obtained from the distance measured value at each range-finding point indicated by the output from the infrastructure sensor 100 and from the output direction of the laser beam corresponding to the range-finding point. Then, the position is coordinate-transformed from the sensor coordinate system to the global coordinate system, thereby acquiring the measurement position data at each range-finding point in the global coordinate system.

Subsequently, in STEP2, the movable region estimation unit 53 acquires the current position (X_f2(t), Y_f2(t)) of each mobile body A estimated by the mobile body motion estimation device 1 from the mobile body motion estimation device 1.

Subsequently, in STEP3, the movable region estimation unit 53 performs mobile body position cancellation processing for excluding the existing region of the mobile body A from the obstacle existing region.

Figure 14:
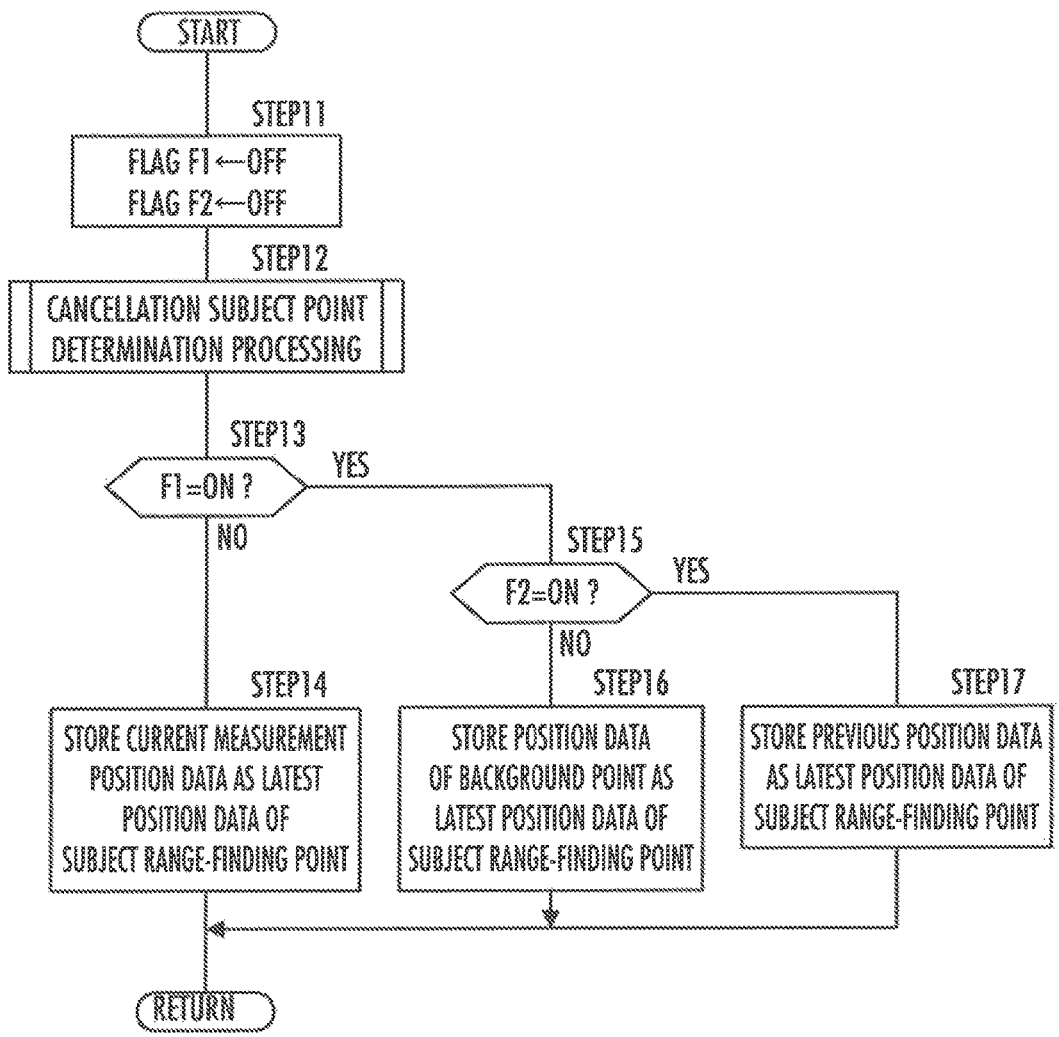
FIG. 14 is a flowchart illustrating the processing of STEP 3 of FIG. 13.

The mobile body position cancellation processing is performed as illustrated in the flowchart of FIG. 14 for each range-finding point where the range-finding data is normally obtained among all range-finding points of each infrastructure sensor 100. Hereinafter, individual range-finding points as the subjects of this processing will be referred to as "subject range-finding points."

In the mobile body position cancellation processing, the movable region estimation unit 53 initializes the value of a flag F1 and the value of a flag F2 to OFF in STEP 11, where the flag F1 indicates by ON or OFF whether or not the subject range-finding point is a point in the existing region of the mobile body A and the flag F2 indicates by ON or OFF whether or not the background point corresponding to the subject range-finding point is a point in an occlusion region which is occluded by the mobile body A viewed from the infrastructure sensor 100 among the regions outside the existing region of the mobile body A. The occlusion region is an unmeasurable region (dead angle region) where the infrastructure sensor 100 cannot perform measurement.

Figure 16:
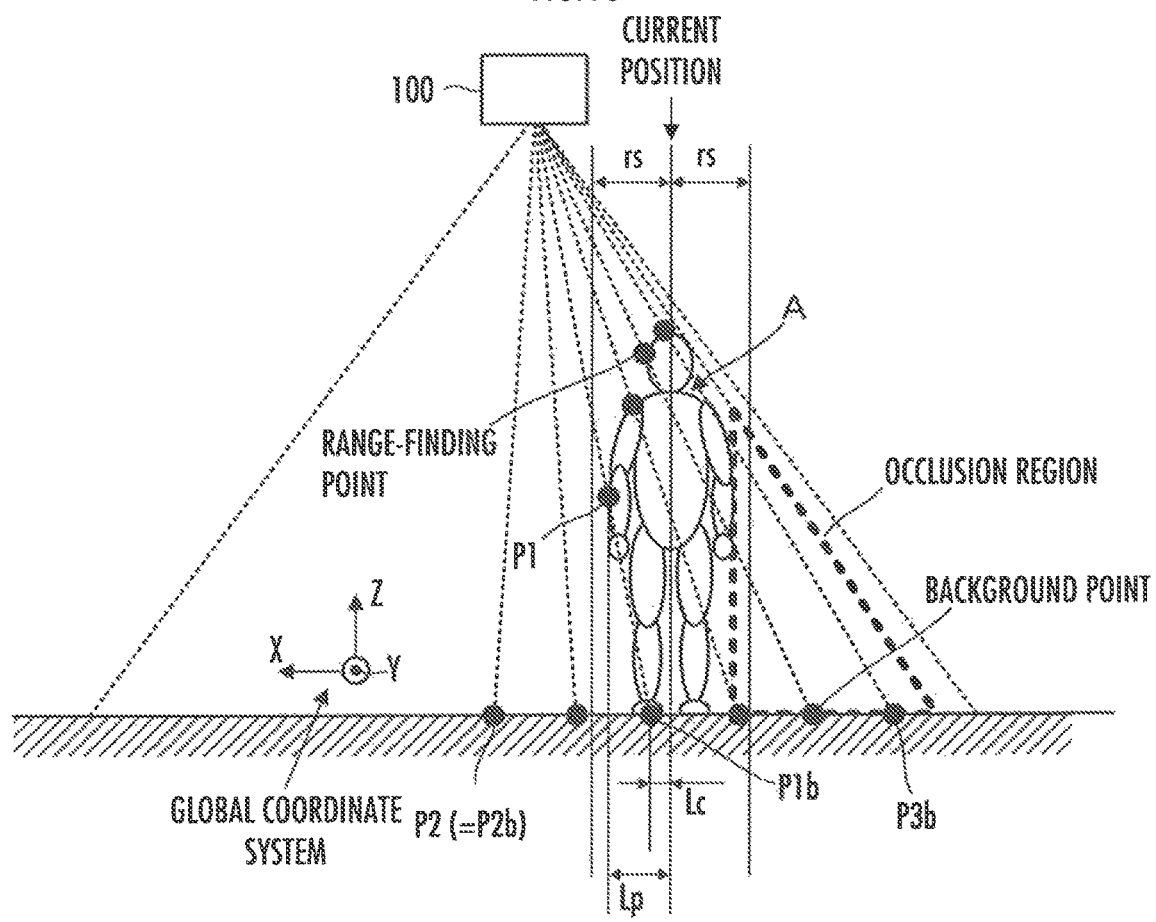
FIG. 16 is an explanatory diagram on the processing of the movable region estimation unit illustrated in FIG. 12.

To give further details about the aforementioned "background point," an obstacle (an obstacle able to be appropriately moved) other than fixedly-arranged installation objects, a floor surface in an operating environment space in a state where no mobile body exists, and a fixedly-arranged installation object are totally referred to as "background part" in the description of this embodiment. In addition, a point at which the center line of the laser beam in the output direction corresponding to each range-finding point abuts against the background part is referred to as "background point corresponding to the range-finding point." In case any object does not exist between the infrastructure sensor 100 and the background part in each output direction of the laser beam of the infrastructure sensor 100, the range-finding point corresponding to the output direction coincides with the background point corresponding thereto. For example, if a certain range-finding point is a point P1 on the mobile body A as illustrated in FIG. 16, the background point corresponding to the range-finding point P1 is a point P1b in FIG. 16. Moreover, if the range-finding point is a point P2 on the background part, the range-finding point P2 coincide with the background point P2b corresponding thereto.

In this embodiment, position data (position viewed in the global coordinate system) of the background point corresponding to each output direction of the laser beam from each infrastructure sensor 100 is previously measured. Furthermore, the position data of each background point is previously stored in the control device 51 or in a storage device of an external server capable of communicating with the control device 51.

Subsequently, in STEP 12, the movable region estimation unit 53 performs cancellation subject point determination processing of determining whether or not the subject range-finding point is a point to be cancelled. In this respect, the point to he cancelled is a range-finding point located within the existing region of the mobile body A (the range-finding point for which the flag F1 should be set to ON). The point to be cancelled is a range-finding point at which the position data of the point to be cancelled is changed to position data different from the measurement position data by the processing described later.

Figure 15:
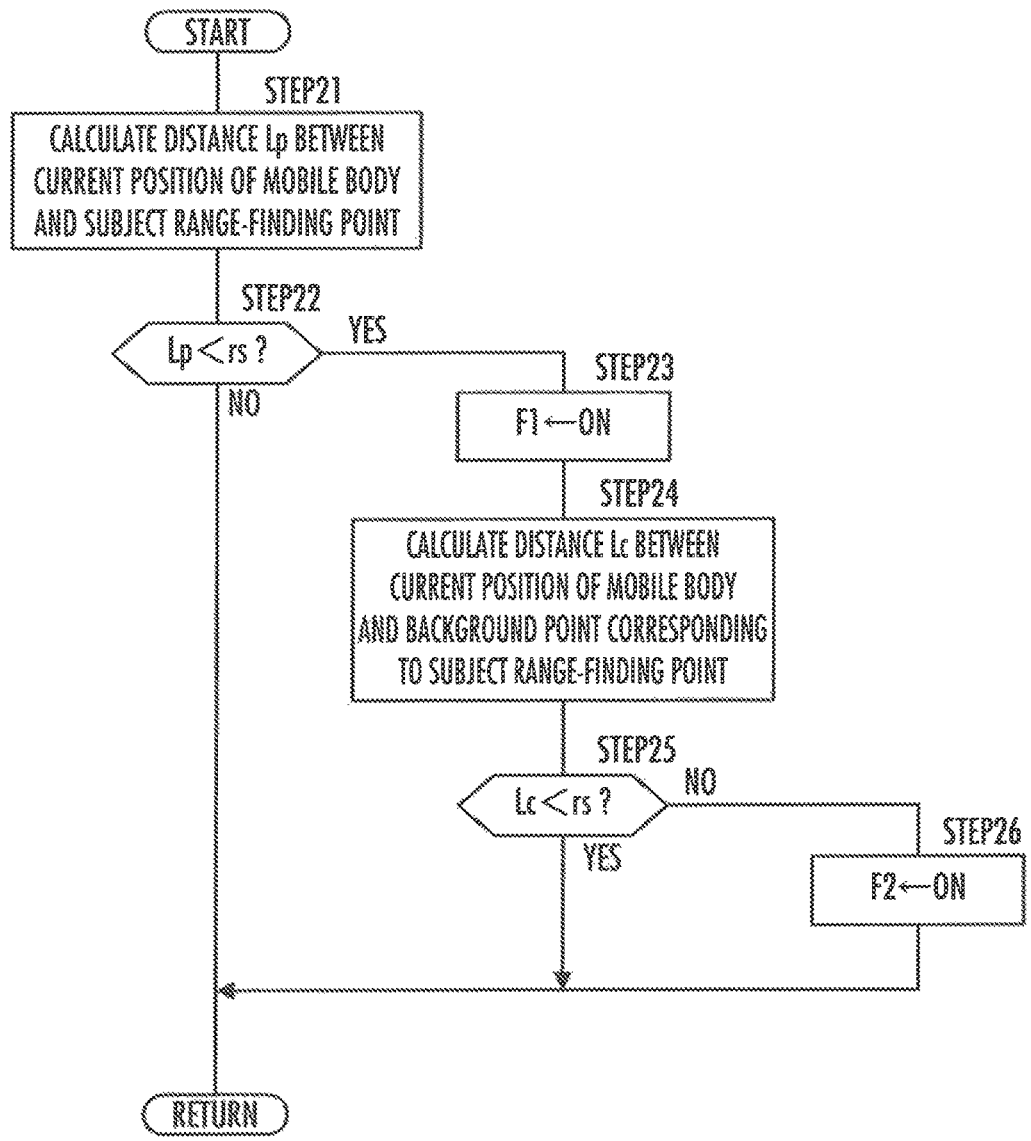
FIG. 15 is a flowchart illustrating the processing of STEP 12 of FIG. 14.

The aforementioned cancellation subject point determination processing is performed as illustrated in the flowchart of FIG. 15. The cancellation subject point determination processing is successively performed with respect to each of all the mobile bodies A having acquired the position ($X\_f2(t), Y\_f2(t)$) in STEP 2 (all mobile bodies for which the mobile body motion estimation device 1 has performed the estimation of the moving speed or the like). Therefore, in the following description of the cancellation subject point determination processing, the mobile body A means an arbitrary mobile body A among the aforementioned all mobile bodies A.

In the cancellation subject point determination processing, the movable region estimation unit 53 calculates a distance Lp between the current position of the mobile body A and the subject range-finding point (a horizontal distance on a two-dimensional plane [XY coordinate plane]) in STEP 21. The distance Lp is calculated from the value of the current position ($X\_f2(t), Y\_f2(t)$) acquired in STEP 2 with respect to the mobile body A and the coordinate position in the X-axis direction and in the Y-axis direction among the position data acquired in STEP 1 with respect to the subject range-finding point.

Figure 17:
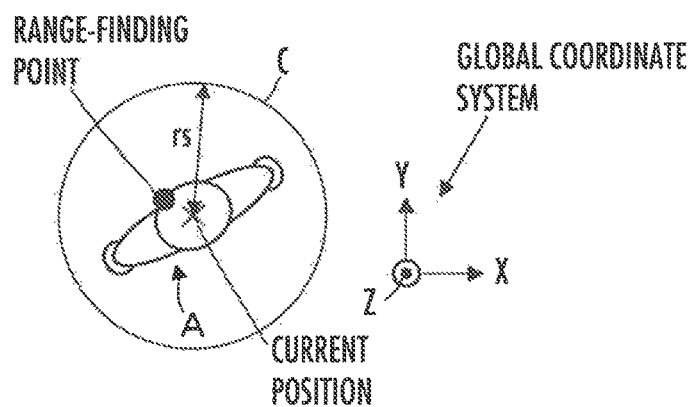
FIG. 17 is an explanatory diagram on the processing of the movable region estimation unit illustrated in FIG. 12.

Subsequently, in STEP 22, the movable region estimation unit 53 determines whether or not the distance Lp is smaller than a predetermined distance rs. This determination is processing of determining whether or not the subject range-finding point is located on the mobile body A. Specifically, in this embodiment, as illustrated in FIG. 17, a range-finding point within the predetermined distance rs from the current position ($X\_f2(t), Y\_f2(t)$) of the mobile body A estimated by the mobile body motion estimation device 1 (the range-finding point within the circle C in FIG. 17) is considered to be a range-finding point on the mobile body A.

In this case, in this embodiment, the predetermined distance rs is set to a different value between the case where the mobile body A is measured in range-finding only by one infrastructure sensor 100 (in the case where the mobile body A exists in a region not overlapping any of the measurement subject regions of adjacent other infrastructure sensors 100 in the measurement subject region of one infrastructure sensor 100: hereinafter, this case is referred to as "first case") and the case where the mobile body A is measured in range-finding by two infrastructure sensors 100 and 100 adjacent to each other (in the case where the mobile body A exists in a region where measurement subject regions of the infrastructure sensors 100 and 100 adjacent to each other overlap each other hereinafter, this case is referred to as "second case").

In the first case, the aforementioned predetermined distance rs is set to a value slightly longer (greater by a predetermined amount) than a half of the maximum width of the mobile body A.

On the other hand, in the second case, an error of the estimated value of the position of the mobile body A obtained by integrating measurement data of the infrastructure sensors 100 and 100 is greater than in the first case in some cases due to a deviation in measurement timing of the infrastructure sensors 100 and 100 adjacent to each other.

Therefore, in the second case, the aforementioned predetermined distance rs is set to a value slightly greater than in the first case.

In this manner, in STEP 22, it is determined whether or not LP<rs by using the value of the predetermined distance rs which differs depending on whether the situation is in the first case or in the second case.

If the determination result of STEP 22 is negative, the movable region estimation unit 53 considers that the subject range-finding point is not a point to be cancelled. In this case, the movable region estimation unit 53 terminates the cancellation subject point determination processing without changing the values of the flags F1 and F2 corresponding to the subject range-finding point (with F1 =OFF and F2 =OFF maintained).

Moreover, if the determination result of STEP 22 is affirmative, the movable region estimation unit 53 considers that the subject range-finding point is a point to be cancelled. In this case, the movable region estimation unit 53 sets the value of the flag F1 corresponding to the subject range-finding point to ON in STEP 23.

Furthermore, the movable region estimation unit 53 calculates a distance Lc (a horizontal distance on a two-dimensional plane [XV coordinate plane]) between the current position of the mobile body A and the background point corresponding to the subject range-finding point in STEP 24 in order to determine whether or not the background point corresponding to the subject range-finding point is a point in the occlusion region which is occluded by the mobile body A in the outside of the existing region of the mobile body A.

The distance Lc is calculated from the value of the current position ($X\_f2(t), Y\_f2(t)$) acquired in STEP 2 with respect to the mobile body A and from the coordinate position in the X-axis direction and in the Y-axis direction among the position data (position data previously stored in the storage device) of the background point corresponding to the subject range-finding point.

Furthermore, in STEP 25, the movable region estimation unit 53 determines whether or not the calculated value of the aforementioned distance Lc is smaller than the predetermined distance rs (the predetermined distance rs used in the determination processing of STEP 22).

If the determination result of STEP 25 is affirmative, the background point corresponding to the subject range-finding point (the range-finding point on the mobile body A) is a point within the existing region of the mobile body A (for example, a point P1b in FIG. 16). In this case, the movable region estimation unit 53 terminates the cancellation subject point determination processing without changing the value of the flag F2 corresponding to the subject range-finding point (with the value of the flag F2 maintained at OFF).

On the other hand, if the determination result of STEP 25 is negative, the background point corresponding to the subject range-finding point (the range-finding point on the mobile body A) is a point within an occlusion region which is outside the existing region of the mobile body A (for example, a point P3b in FIG. 16). In this case, the movable region estimation unit 53 sets the value of the flag F2 to ON in STEP 26 and then terminates the cancellation subject point determination processing.

Returning to FIG. 14, the movable region estimation unit 53 performs the cancellation subject point determination processing as described above and then determines whether or not the value of the flag F1 is ON in STEP 13.

If the determination result is negative (if F1 =OFF), the movable region estimation unit 53 stores the current measurement position data acquired in STEP 1, with respect to the subject range-finding point, as the latest position data (the position data decided at the current arithmetic processing cycle) directly into the storage device in STEP 14.

Moreover, if the determination result of STEP 13 is affirmative (if F1 =ON), the movable region estimation unit 53 then determines whether or not the value of the flag F2 is ON in STEP 15.

If the determination result is negative (if F2 =OFF), the background point corresponding to the subject range-finding point is a point within the existing region of the mobile body A and therefore can be considered to be a point within a region where no obstacle exists. Therefore, in this case, the movable region estimation unit 53 stores the position data of the background point corresponding to the subject range-finding point as the latest position data of the subject range-finding point in STEP 16.

On the other hand, if the determination result of STEP 15 is affirmative (if F2 =ON), it is unknown whether or not that the background point corresponding to the subject range-finding point is in a region where no obstacle exists.

Therefore, in this case, the movable region estimation unit 53 stores the position data (the previous position data), which has been decided with respect to the subject range-finding point at the previous arithmetic processing cycle, as the latest position data of the subject range-finding point in STEP 17.

Returning to FIG. 13, after performing the mobile body position cancellation processing as described above, the movable region estimation unit 53 then performs processing (floor determination processing) of determining whether or not each range-finding point of the infrastructure sensor 100 is on the floor (substantially flat surface) in STEP 4.

In this case, if the height data (the coordinate position in the Z-axis direction in the global coordinate system) among the position data of each range-finding point is within a predetermined range which has been determined in advance as one corresponding to the height position of the floor, the range-finding point is determined to be a point on the floor.

Subsequently, the movable region estimation unit 53 performs noise processing of compensating the noise components in STEP 5 and then performs grid transformation processing of creating grid data in STEP 6.

Figure 18:
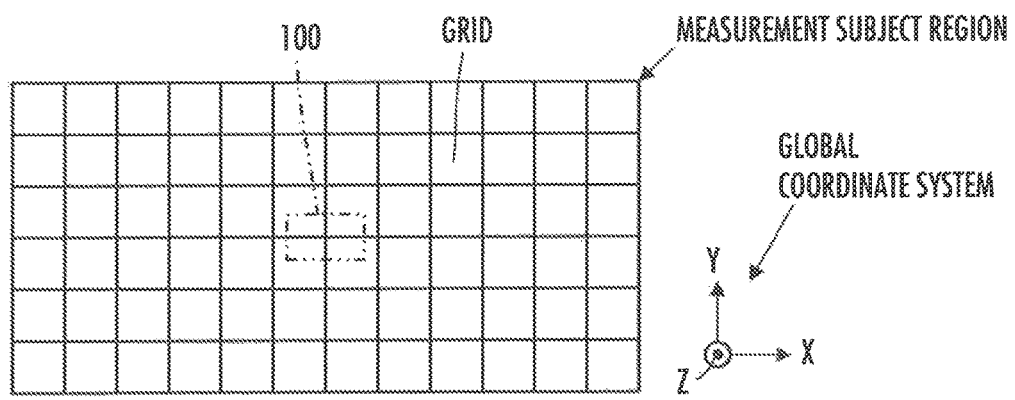
FIG. 18 is an explanatory diagram on the processing of the movable region estimation unit illustrated in FIG. 12.

In this respect, the term "grid" means each region in the case of virtually dividing a measurement subject region (more specifically, a measurement subject region viewed when being projected on a horizontal two-dimensional plane [XY coordinate plane]) of the infrastructure sensor 100 in the floor (a floor including an obstacle) of the operating environment space into a plurality of regions of small area (square-shaped regions in the illustrated example) as illustrated in FIG. 18. In addition, the aforementioned grid data is information indicating to which region each grid (the region of small area) belongs among a floor region, a non-floor region (an obstacle existing region), and an unknown region that cannot be determined to be the floor region or the non-floor region.

In this case, each grid is determined to be a grid of the unknown region in a case a valid (normal range-finding data is obtained) range-finding point does not exist inside the grid in this embodiment. Moreover, if a valid range-finding point exists inside the grid, each grid is determined to be a grid of the floor region if the percentage of the number of range-finding points determined to be range-finding points on the floor among the total number of range-finding points in the grid is equal to or greater than a predetermined percentage (for example, 100%), or otherwise determined to be a grid of the non-floor region. Incidentally, the floor region is a movable region of the mobile body A2 to be controlled.

According to the processing of STEPS 1 to 6 described hereinabove, grid data for each infrastructure sensor 100 is created.

Subsequently, in STEP 7, the movable region estimation unit 53 creates integrated grid data formed by integrating grid data of the respective infrastructure sensors 100.

In this respect, in a region other than the region where the measurement subject regions of the infrastructure sensors 100 and 100 adjacent to each other overlap each other (a region corresponding only to one infrastructure sensor 100), the grid data set in STEP 6 is directly set as integrated grid data.

Moreover, in the region where the measurement subject regions of the infrastructure sensors TOO and 100 adjacent to each other overlap each other, the same grid data is set in each of the grids with respect to the grids whose grid data corresponding to the both infrastructure sensors 100 and 100 are the same as each other.

Furthermore, with respect to the grids whose grid data corresponding to the both infrastructure sensors 100 and 100 are different from each other, the grids are considered to be of the floor region if the grid data corresponding to one infrastructure sensor indicates that the grid is of the floor region and the grid data corresponding to the other infrastructure sensor indicates that the grid is of the unknown region, or otherwise the grids are considered to be of the non-floor region.

Subsequently, in STEP 8, the movable region estimation unit 53 extracts a movable region of the mobile body A2 to be controlled from the integrated grid data. In this case, whole grids considered to be the floor regions among the integrated grid data are extracted as a movable region. Regions other than the movable region are unmovable regions where the mobile body A2 is inhibited from moving.

The above is the processing of the movable region estimation unit 53.

Subsequently, the moving track control unit 54 sequentially sets the target moving track of the mobile body A to be moved by using the movable region obtained by the movable region estimation unit 53 as described above and the future position of the mobile body A (a mobile body other than the mobile body A2 to be controlled) predicted by the future position prediction unit 52.

In this case, the target moving track of the mobile body A2 to be controlled is set so that the mobile body A2 to be controlled is moved in regions not violating the unmovable regions which are not movable regions and the future positions of other mobile bodies A.

Specifically, the target moving track is generated so that the mobile body A2 to be controlled does not come into contact with an obstacle in the unmovable region or with other mobile bodies A during the movement of the mobile body A2 in the case of moving the mobile body A2 to be controlled according to the target moving track.

Figure 19:
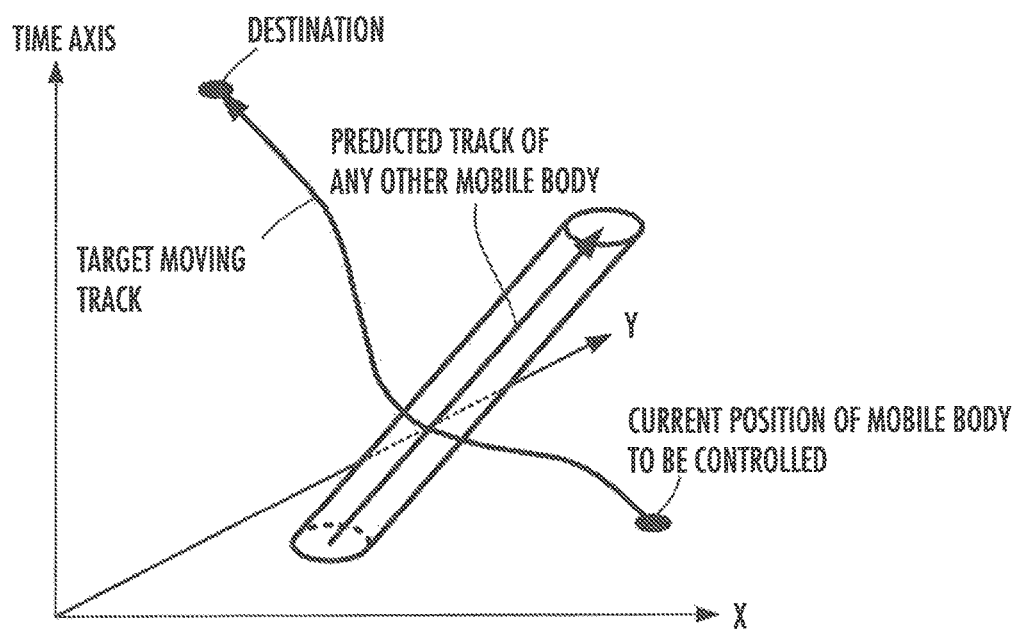
FIG. 19 is an explanatory diagram on the processing of a moving track control unit illustrated in FIG. 12

As an example, in the case where the mobile body A2 to be controlled is linearly moved to a destination and where it is predicted that the mobile body A2 comes into contact with any other mobile body A during the movement, for example, as illustrated in FIG. 19, the target moving track is created so as to bypass the existing region of the mobile body A on the predicted track of any other mobile body A and so as to avoid the unmovable region not illustrated. Incidentally, the target moving track is properly corrected according to the moving situation or the like of any other mobile body A.

Then, accordingly, the arrival time of the mobile body A2 to be controlled at the destination is also properly corrected.

Furthermore, the moving track control unit 54 instructs the target moving track set as described above for the mobile body A2 to be controlled. In this case, the mobile body A2 to be controlled controls its own action via an actuator so as to move on the instructed target moving track.

Additionally, as a more specific method of generating the target moving track, for example, the method described in Patent Document 1 or the like can be adopted.

According to the fifth embodiment described hereinabove, it is possible to move the mobile body A2 to be controlled to a required destination without interference with any other mobile body A or an obstacle. In this case, the moving speed of each mobile body A is estimated as described above by the mobile body motion estimation device 1 and therefore the future position prediction unit 52 is able to predict the future positions of other mobile bodies A with high reliability. As a result, the reliability of the target moving track of the mobile body A2 to be controlled is able to be increased.

Moreover, in the processing of the movable region estimation unit 53, the position data of the range-finding point in an occlusion region, where measurement is disabled due to an existence of the mobile body A between the infrastructure sensor 100 and the floor, is considered to be the previous position data. Therefore, the position data of the range-finding point in the occlusion region is considered to be the latest position data among the position data measured in the past.

Furthermore, in this case, if the previous position data falls within the movable region, the occlusion region is able to be obtained as a movable region. This enables the occlusion region to be used as a movable region, thereby preventing the movable region from being unnecessarily smaller.

The present invention is not limited to the embodiments described hereinabove. Some variations will be described below.

The mobile body in the present invention may be a mobile body other than a legged mobile body. Even if the mobile body is not a legged mobile body, the instantaneous moving speed of the mobile body includes a periodic vibration component in some cases along with a periodic action of the mobile body, depending on a way of performing an action or the like of the mobile body. For example, if a wheelchair is moved by a person on the wheelchair, the moving speed of the wheelchair generates periodic vibrations in many cases. Therefore, in this case, the moving speed estimation device of the present invention is applicable.

In the above embodiment, the moving speed and position of the mobile body in the two-axis direction, namely X-axis and Y-axis direction, are estimated via the filtering processing unit 5. Regarding, for example, the estimation of the position of the mobile body, however, the filtering processing by the filtering processing unit 5 may be omitted.

Moreover, it is also possible to estimate the moving speed in only one-axis direction or to estimate the moving speed in the three-axis direction (three-dimensional). For example, in the case where a person or a legged mobile body such as a legged mobile robot goes up and down stairs, the moving speed in the three-axis direction may be estimated.

In addition, in the first and second embodiments, for example, while the mobile body is moving, the waveform data of the estimated value of the instantaneous moving speed may be regularly input to the vibration component information estimation unit 4 so as to update the estimated values of the first vibration frequency f1 and the second vibration frequency f2 appropriately (consequently to update the removal subject indicating information).

What is claimed is:

1. A control device for a mobile body for performing movement control of the mobile body, which moves in an operating environment space, the control device comprising a moving speed estimation device for the mobile body for estimating a moving speed of the mobile body which moves at speed including a periodic vibration component generated along with a periodic moving action, the moving speed estimation device comprising:
   a position measuring unit which sequentially measures a position of the mobile body;
   an instantaneous moving speed estimation unit which sequentially estimates an instantaneous moving speed of the mobile body from a time series of a measured value of the position of the mobile body obtained by the position measuring unit;
   a vibration component information estimation unit which estimates a vibration cycle or vibration frequency of the periodic vibration component included in a time series of the instantaneous moving speed of the mobile body along with the periodic moving action of the mobile body; and
   a speed estimated value adjustment processing unit which sequentially generates speed values as estimated values of the moving speed of the mobile body, where the speed values are obtained by performing at least processing of removing a vibration component corresponding to the estimated value of the vibration cycle or vibration frequency obtained by the vibration component information estimation unit for the time series of an estimated value of the instantaneous moving speed obtained by the instantaneous moving speed estimation unit,
   wherein the generated speed values are used in performing movement control of the mobile body.

2. The control device according to claim 1, wherein the vibration component information estimation unit is configured to estimate the vibration cycle or vibration frequency from a frequency at which a spectral intensity has a peak value in spectral distribution data obtained by transforming the time series of the estimated value of the instantaneous moving speed of the mobile body to a frequency domain.

3. The control device according to claim 1, wherein the vibration component information estimation unit is configured to estimate the vibration cycle or vibration frequency based on previously-created data for estimating the vibration cycle or vibration frequency.

4. The control device according to claim 3, wherein:
   the data is correlation data representing a relationship between the moving speed and the vibration cycle or vibration frequency of the mobile body; and
   the vibration component information estimation unit is configured to update the estimated value of the vibration cycle or vibration frequency based on the correlation data from the estimated value of the moving speed fed back from the speed estimated value adjustment processing unit.

5. The control device according to claim 1, wherein the speed estimated value adjustment processing unit is configured to perform processing of removing the vibration component corresponding to the estimated value of the vibration cycle or vibration frequency with a band-stop filter configured based on the estimated value of the vibration cycle or vibration frequency.

6. The control device according to claim 1, wherein:
the mobile body is a legged mobile body;
the speed estimated value adjustment processing unit is configured to perform processing of removing the vibration component of a first vibration frequency, which is a lowest frequency, among the vibration components as the vibration component generated along with the periodic moving action of the mobile body and the vibration component of a second vibration frequency, which is a double frequency of the first vibration frequency, from the estimated value of the instantaneous moving speed; and
the vibration component information estimation unit is configured to estimate at least one of the first vibration frequency, a first vibration cycle corresponding to the first vibration frequency, the second vibration frequency, and a second vibration cycle corresponding to the second vibration frequency.

7. The control device according to claim 1, wherein the speed estimated value adjustment processing unit is configured to sequentially generate the estimated values of the moving speed of the mobile body by further performing processing of removing components in a high frequency range that is higher than the vibration component with a high-frequency component removal filter in addition to the vibration component corresponding to the estimated value of the vibration cycle or vibration frequency from the estimated value of the instantaneous moving speed.

8. A control device for a mobile body for performing movement control of a mobile body to be controlled, which moves in an operating environment space, the device comprising:
 a future position prediction unit which predicts a future position of each of mobile bodies existing in the operating environment space;
 a movable region estimation unit which estimates a movable region of the mobile body to be controlled;
 a moving speed estimation device configured so as to be able to estimate a moving speed of each of the mobile bodies which move at speed including a periodic vibration component generated along with a periodic moving action, the moving speed estimation device comprising:
  a position measuring unit which sequentially measures a position of the each of the mobile bodies;
  an instantaneous moving speed estimation unit which sequentially estimates an instantaneous moving speed of each of the mobile bodies from a time series of a measured value of the position of each of the mobile bodies obtained by the position measuring unit;
  a vibration component information estimation unit which estimates a vibration cycle or vibration frequency of the periodic vibration component included in a time series of the instantaneous moving speed of each of the mobile bodies along with the periodic moving action of each of the mobile bodies; and
  a speed estimated value adjustment processing unit which sequentially generates speed values as estimated values of the moving speed of each of the mobile bodies, where the speed values are obtained by performing at least processing of removing a vibration component corresponding to the estimated value of the vibration cycle or vibration frequency obtained by the vibration component information estimation unit for the time series of an estimated value of the instantaneous moving speed obtained by the instantaneous moving speed estimation unit,
  wherein the position measuring unit is configured so as to be able to measure a position of an object existing in the operating environment space including each of the mobile bodies; and
 a moving track control unit which controls a moving track of the mobile body to be controlled,
wherein:
the future position prediction unit is configured to predict the future position of each of the mobile bodies by using the moving speed estimated by the moving speed estimation device with respect to each of the mobile bodies;
the movable region estimation unit is configured to estimate a combined region of a region where it is recognized that no object exists from measurement data of the position measuring unit and an existing region of each of the mobile bodies whose moving speed is estimated by the moving speed estimation device, as the movable region, in the operating environment space; and
the moving track control unit is configured to control the moving track of the mobile body to be controlled so that the mobile body to be controlled is moved in a region not interfering with an unmovable region which is other than the movable region estimated by the movable region estimation unit and with future positions of other mobile bodies predicted by the future position prediction unit, when the mobile body to be controlled is moved.

9. The control device for the mobile body according to claim 8, wherein the movable region estimation unit is configured to determine whether or not an unmeasurable region should be a movable region based on past measurement data with respect to the unmeasurable region, in a case where the unmeasurable region exists, where measurement data is not able to be generated according to a positional relationship between a sensor for generating the measurement data of the position measuring unit and any of the mobile bodies.

10. The control device for the mobile body according to claim 9, wherein the movable region estimation unit is configured to determine the unmeasurable region as a movable region in a case where the unmeasurable region is able to be estimated as a movable region from latest measurement data among the past measurement data about the unmeasurable region.

* * * * *